United States Patent
Hrischuk et al.

(10) Patent No.: US 6,807,583 B2
(45) Date of Patent: Oct. 19, 2004

(54) METHOD OF DETERMINING CAUSAL CONNECTIONS BETWEEN EVENTS RECORDED DURING PROCESS EXECUTION

(75) Inventors: Curtis Hrischuk, Woodinville, WA (US); Charles Murray Woodside, Ottawa (CA)

(73) Assignee: Carleton University, Ottawa (CA)

( * ) Notice: Subject to any disclaimer, the term of this patent is extended or adjusted under 35 U.S.C. 154(b) by 115 days.

(21) Appl. No.: 10/007,211

(22) Filed: Nov. 8, 2001

(65) Prior Publication Data

US 2002/0194393 A1 Dec. 19, 2002

Related U.S. Application Data

(63) Continuation-in-part of application No. 08/937,023, filed on Sep. 24, 1997, now abandoned.

(51) Int. Cl.⁷ ................................................. G06F 9/46
(52) U.S. Cl. ........................ 709/318; 702/182; 714/39; 717/124
(58) Field of Search ................. 702/182–186; 706/52, 900–915; 709/100, 310, 318, 320; 714/37–39, 45; 717/124–135

(56) References Cited

U.S. PATENT DOCUMENTS

| | | | | |
|---|---|---|---|---|
| 5,038,348 A | * | 8/1991 | Yoda et al. | 714/38 |
| 5,301,258 A | * | 4/1994 | Hayashi | 706/52 |
| 5,313,616 A | * | 5/1994 | Cline et al. | 717/127 |
| 5,442,555 A | * | 8/1995 | Reifman et al. | 701/99 |
| 5,483,637 A | * | 1/1996 | Winokur et al. | 714/26 |
| 5,493,729 A | * | 2/1996 | Nigawara et al. | 706/52 |
| 5,661,668 A | * | 8/1997 | Yemini et al. | 702/186 |
| 5,937,195 A | * | 8/1999 | Ju et al. | 395/709 |
| 5,960,199 A | * | 9/1999 | Brodsky et al. | 395/704 |
| 6,067,415 A | * | 5/2000 | Uchihira | 395/704 |
| 6,205,575 B1 | * | 3/2001 | Sherman et al. | 717/1 |
| 6,330,008 B1 | * | 12/2001 | Razdow et al. | |

* cited by examiner

Primary Examiner—John Follansbee
Assistant Examiner—G. L. Opie
(74) Attorney, Agent, or Firm—Clifford H. Kraft

(57) ABSTRACT

A method of determining scenario causality, along with precedence causality, is disclosed. Information is recorded relating to events occurring during execution of a process. The information includes object related information and process related information. The information is translated into a sequence of scenario graph language statements, one or more events translated to a statement. From the statements, process execution flow is determined establishing some scenario causality and precedence causality.

21 Claims, 9 Drawing Sheets

METHOD OF DETERMINING CAUSAL CONNECTIONS BETWEEN EVENTS RECORDED DURING PROCESS EXECUTION

This is a continuation-in-part of U.S. patent application Ser. No. 08/937,023 filed Sep. 24, 1997 now abandoned.

FIELD OF THE INVENTION

This invention relates generally to process execution and more particularly to determining causality for information stored during concurrent and distributed software process execution.

BACKGROUND OF THE INVENTION

In application execution and analysis, tracing is a term having many similar but distinct meanings. Tracing implies a following of process execution. Often such tracing incorporates recording information relating to a process during execution. In essence, a process that executes and has information there about recorded is considered a traced process.

In the past, tracing of computer software application programs has been performed for two main purposes— debugging and optimisation. In debugging, the purpose of tracing is to trace back from an abnormal occurrence—a— bug to show a user a flow of execution that occurred previous to the abnormal occurrence. This allows the user to identify an error in the executed program. Unfortunately, commands executed immediately previous to an abnormality are often not a source of the error in execution. Because of this, much research is currently being conducted to better view trace related data in order to more easily identify potential sources of bugs.

Debuggers are well known in the art of computer programming and in hardware design. In commonly available debuggers, a user sets up a trace process to store a certain set of variables upon execution of a particular command while the program is in a particular state. Upon this state and command occurring, the variables are stored. A viewer is provided allowing the user to try to locate errors in the program that result in the bug. Usually, debuggers provide complex tracing tools which allow for execution of a program on a line by line basis and also allow for a variety of break commands and execution options. Some debuggers allow modification of parameters such as variable values or data during execution of the program. These tools facilitate error identification and location.

Unfortunately, using multiprocessor or networked systems, it is difficult to ensure that a system will function as desired and also, it is difficult to ascertain that a system is actually functioning as desired. Many large, multiprocessor systems appear to execute software programs flawlessly for extended periods of time before bugs are encountered. Tracing these bugs is very difficult because a cause of a bug may originate from any of a number of processors which may be geographically dispersed. Also, many of these bugs appear intermittently and are difficult to isolate. Using a debugger is difficult, if not impossible, because multiple debugging sessions must be established and coordinated.

In contrast for optimisation, it is important to know which commands are executed most often in order to optimise a software program. For example, when an application during normal execution executes a first subroutine once, a second subroutine twice, and a third subroutine seventy times, each subroutine requiring a similar time span for execution, optimising the subroutine which runs seventy times is clearly most important. In system optimisation, tracing is not actually performed except in so far as statistics of routine execution and execution times are maintained. These statistics are very important because they allow for a directed optimisation effort at points where the software executes slowest or where execution will benefit most. Statistics as captured for program optimisation, are often useful in determining execution bottlenecks and other unobvious problems encountered. Examples of optimisation based modelling or tracing include systems described in the following references:

P. Dauphin, R. Hofmann, R. Klar, B. Mohr, A. Quick, M. Siegle, and F. Sotz. "ZM4/Simple: A general approach to performance measurement and evaluation of distributed systems." In T. Casavant and M. Singhal, editors, Readings in Distributed Computing Systems, pages 286–309. IEEE Computer Society Press, Los Alamitos, Calif., 1994;

M. Heath and J. Etheridge. "Visualizing the performance of parallel programs." IEEE Software, 8(5):29–39, September 1991;

C. Kilpatrick and K. Schwan. "ChaosMON—application-specific monitoring and display of performance information for parallel and distributed systems." Proceedings of the ACMI ONR Workshop on Parallel and Distributed Debugging, May 1991; and, J. Yan. "Performance tuning with an automated instrumentation and monitoring system for multicomputers AIMS." Proceedings of the Twenty-Seventh Hawaii International Conference on System Sciences, January 1994.

Software performance models of a design prior to product implementation reduce risk of performance-related failures. Performance models provide performance predictions under varying environmental conditions or design alternatives and these predictions are used to detect problems. To construct a model, a software description in the form of a design document or source code is analysed and translated into a model format. Examples of model formats are a simulation model, queuing network model, or a state-based model like a Petri-Net. The effort of model development makes it unattractive, so performance is usually addressed only in a final product. This has been termed the "fix-it-later" approach and the seriousness of the problems it creates is well documented.

In order to determine that a process is in fact executing as desired or to construct a performance model for optimisation requires an understanding of causality within a software application. Commonly, the only causal connection determined automatically is precedence. For example, in determining system statistics, it is easily recorded which subroutine was executed when. This results in knowledge of precedence when the entire process is executed on a single processor. However, given this knowledge, it is difficult to determine anything other than precedence.

Time and Causality

For concurrent or distributed software computations a common synchronised time reference is unavailable. A system operating on the earth and another system operating in space illustrate this problem. When the system on earth performs an activity and transmits a message to the system in space, an evident time delay occurs between message transmission and message reception. Once a system is in space, synchronising its time source precisely with that of an earth bound system is difficult. When the system in space is moving, such a synchronisation is unlikely. A same problem, though on a smaller scale, exists in earth bound networks.

Each computer is bound to an independent time source and synchronisation of time sources is difficult. With advances in computer technology and processing speeds, these synchronisation difficulties are becoming no less significant than those experienced with space bound systems.

The lack of a common time reference, as well as other problems with observing a distributed system, have led to a notion of causality that is probability based. This "probabilistic causality" is a probability estimate of an event having occurred. Probabilistic causality uses a database of information (e.g., application structure, network configuration), a sophisticated data reduction algorithm (i.e., expert system), and trace records to make an educated guess at the source of problems in a complex system based on observable events. Although probabilistic causality is useful for network fault diagnosis it should not be confused with the stricter definition of causality that is being espoused here which is not probability based. Examples of probabilistic causality are found in U.S. Pat. Nos. 5,661,668 and 5,483,637.

In order to determine causality, it is beneficial to determine which events happened before which other events, described here as precedence causality. Precedence is a commonly known form of causality; for example, an executable instruction is not executed until a previous instruction is executed given no branching instructions. This precedence based causality is used heavily for debugging. Often, once an anomaly is discovered during execution, previous executed instructions are reviewed to determine a cause of the anomaly. For single processor systems, such an analysis is straightforward; however for network applications, time source synchronisation presents problems and therefore, precedence is not immediately evident.

Because of the above when more than one computer are networked together, precedence is not determined through recording of time. Even when a synchronisation of clocks occurs via a communication link, a time delay caused by communication times exists between computers and the recorded times are inaccurate. The resulting clock times are not useful for determining precedence between instructions or activities executing on different processors.

In an attempt to overcome this problem, it has been proposed that a logical clock may be used to record time in the form of a partial ordering of recorded times. Several types of logical clocks are known for use in a classical model of a distributed system.

In the classical model of a distributed system, according to a survey paper by Schwarz and Mattem entitled "Detecting causal relationships in distributed computations: in search of the Holy Grail" (Distributed Computing, 7(3): 149–174, 1994), a distributed system consists of N objects: $P_1 \ldots P_N$. The objects interact solely by point-to-point message communication with finite but unpredictable delay; knowledge about structure of a communication network is not available; first in first out (FIFO) order of message delivery is not assumed; and a global clock, or perfectly synchronised clocks local to each process, are not available. Each object executes a local algorithm to determine its reaction to incoming messages. The occurrence of actions such as a local state change or sending a message performed by the local algorithm are called events. Events are recorded atomically. Concurrent and co-ordinated execution of all local algorithms composes a distributed computation.

A distributed computation is described by ordering events to agree with an order of execution. Let $E_i$ denote a set of events occurring in object $P_i$ in the form of a history of events, and let $E=E_1 \cup E_2 \ldots \cup E_N$ denote a set of all events of the distributed computation. These event sets evolve dynamically as computation progresses. Since each $P_1$ is strictly sequential, its sequence of events, $E_i$, are ordered by their occurrence and written as $E_i=\{e_{i1}, e_{i2}, e_{i3}, \ldots\}$.

For the classical model, three event types are recorded: a send event, a receive event, and an internal event. A send event reflects the fact that a message was sent asynchronously. A receive event denotes the receipt of a message together with local state changes according to the contents of that message. Internal events reflect changes to local object states. This description does not account for conflicts or non-determinism since it is based on events that have actually occurred. The precedence relation is used as a basis for constructing logical clocks. According to the precedence relation an event with a later logical time occurred after an event with an earlier logical time where. Also, two events with same logical times in an event set are concurrent which indicates that they may have occurred in any order or simultaneously. Essentially, a concurrency relation indicates that a precedence relation cannot determine which of two events happened first.

Precedence Causality's Failure to Define Scenarios

The precedence relation does not identify when events are independent because it identifies all past events as being possible causes for the current event. This information can be useful but it is usually overwhelming and it must be analysed by hand to prune out precedence causal relationships. The context information that is most valuable for understanding the system behaviour is the scenario. A scenario is a "specific sequence of actions [events] that illustrates behaviours [for an application]. A scenario may be used to illustrate an interaction or the execution of a use case instance."[1] The interaction is "a specification of how stimuli are sent between [object] instances to perform a specific task. The interaction is defined in the context of a collaboration."[2]

[1]"OMG Unified Modelling Language (UML) Specification" Version 1.3, March 2000 which is the industry standard.
[2]"OMG Unified Modelling Language (UML) Specification" Version 1.3, March 2000 which is the industry standard.

An observed scenario is, informally, a set of objects which execute and interact together, recording events as they execute. The observed scenario is produced by ordering of the events to identify the objects' local interactions and their interactions with each other.

In a sequential application with only one stimulus the order of recorded events (i.e., the system behaviour) is one-to-one with the observed scenario. This is true of every static system where every execution of the application (i.e., scenario behaviour) corresponds to the exact ordering of the events in the system (i.e, system behaviour).

If there are dynamic aspects to the system structure or behaviour, then the one-to-one correspondence of scenario event ordering with the system behaviour is no longer true. The scenario structure cannot be recovered in this case because multiple scenarios are intermingled with each other in the system behaviour. The dynamic aspects involve: multiple simultaneous stimuli, concurrent thread execution, dynamic construction of software components, replication of software components, dynamic communication paths, message queuing, asynchronous message sends, etc. The following three canonical problems describe the problem of recovering and isolating observed scenario structure using precedence causality.

Canonical Problems of Precedence Causality

A fundamental limitation of the precedence causality approach is that it cannot identify scenarios because it cannot identify the end of a scenario, hereafter called "the problem of finding the scenario end". This situation is illustrated in FIG. 1a where there are two scenarios. Each scenario consists of a hidden external event causing Object A to send a message to Object B with each object doing some internal processing (not shown for clarity). As shown in the figure there are two independent scenarios initiated by Object A but there is a network delay such that the second message send of Object A (event $e_{A2}$) overtakes the first message it has sent (event $e_{A1}$).

The scenario causal ordering is that the events of the first scenario are Scenario1=$\{e_{A1} \rightarrow e_{B2}\}$ and the events of the second scenario are Scenario2=$\{e_{A2} \rightarrow e_{B1}\}$. Note that each scenario is properly identified and can be analysed independently of the other (e.g., comparing the actual behaviour against the intended behaviour of a sequence diagram).

The precedence ordering of the two scenarios is shown in FIG. 1a, including the transitive ordering components. The precedence ordering includes the additional event orderings $\{e_{A1} \rightarrow e_{A2}\}$, $\{e_{A1} \rightarrow e_{B1}\}$, $\{e_{A1} \rightarrow e_{B2}\}$, and $\{e_{A1} \rightarrow e_{B2}\}$. These extra event orderings would need to be filtered out before any analysis could be performed because it is not possible to identify the scenarios. It is possible to do the filtering manually for a small example but these additional relationships grow exponentially with the number of events recorded.

A second fundamental limitation of the precedence ordering relation is that an event can only belong to one scenario but it is difficult to determine which event a scenario belongs to. Hereafter called the "problem of scenario association." This is illustrated by FIG. 1b. Is there one or two scenarios in FIG. 1b? There can be one scenario that consists of the events $S_1 = \{e_1, e_2, e_3, e_4\}$, or the two scenarios $S_1 = \{e_1, e_3\}$ and $S_2 = \{e_2, e_4\}$. This problem grows linearly with the number of interactions between objects.

A third limitation of precedence ordering is that events are recorded for a duration of time. Instead, monitoring should be triggered based on the scenario that is being executed. This is the problem of the scenario monitor trigger.

A fourth limitation of precedence ordering is that it is not communication protocol aware. The communication protocol that is used to send and receive information is important for analysis purposes but precedence causality does not capture any information related to it. This is a lack of communication protocol characterization.

A new type of causality, called scenario causality, is needed that overcomes these limitations.

Logical Clock Background

Discussions of implementation mechanics of logical clocks are presented in the following articles:

M. Ahuja, T. Carlson, A. Gahlot, and D. Shands. "Timestamping events for inferring 'Affects' relation and potential causality." In Proceedings 11th International Conference on Distributed Computing Systems (COMPSAC 91), pages 274–281, Arlington, Tex., 1991;

B. Charron-Bost. "Concerning the size of logical clocks in distributed systems." Information Processing Letters, 39:11–16, July 1991;

C. Diehl and C. Jard. "Interval approximations of message causality in distributed executions. " In Proceedings of the Symposium on Theoretical Aspects of Computer Science, pages 363–374. Springer-Verlag, February 1992;

C. Fidge. "Logical time in distributed computing systems." IEEE Computer, pages 28–33, August 1991;

J. Fowler and W. Zwaenepoel. "Causal distributed breakpoints." In Proceedings of 10th International Conference on Distributed Systems, pages 134–141, 1990;

L. Lamport. "Time, clocks, and the ordering of events in a distributed system." CACM, 21(7):558–565, July 1978;

F. Mattern. "Time and global states of distributed systems." in Proceedings International Workshop on Parallel and Distributed Algorithms, pages 215–226, Amsterdam, 1988. Bonas, France, North-Holland;

S. Meldal, S. Sankar, and J. Vera. "Exploiting locality in maintaining potential causality." In Proceedings 10th Annual ACM Symposium on Principles of distributed Computing, pages 231–239, Montreal, Canada, 1991;

M. Raynal and M. Singhal. "Logical time: Capturing causality in distributed systems." Computer, 29(2):49–56, February 1996;

R. Schwarz and F. Mattem. "Detecting causal relationships in distributed computations: in search of the Holy Grail." Distributed Computing, 7(3):149–174, 1994;

M. Singhal and A. Kshemkalyani. "An efficient implementation of vector clocks." Information Processing Letters, 43:47–52, August 1992; and, C. Valot. "Characterizing the accuracy of distributed timestamps." In Proceedings of the ACM IONR Workshop on Parallel and Distributed Debugging, pages 43–52, May 1993.

The implementations described in the above references have several commonalties. Each event is assigned a time stamp from a logical clock, which is used to establish relative ordering of events. If a first event precedes a second event, then the time stamp of the first event is smaller than the time stamp of the second event. To generate the time stamp, every object maintains its own local logical clock that is advanced using a set of prescribed rules. An object's local clock represents its best approximation to a global logical clock. A time stamp is included with every message sent. A receiving object uses the included time stamp to update its local clock. Internal, send, and receive events advance an object's local clock.

Lamport, in the above noted reference, describes a logical clock wherein each object has a scalar local clock in the form of a counter that is incremented with each event. When a message is received that has a larger time stamp than the receiving object's current counter, the received time stamp replaces the current counter value. A total ordering of events can be constructed by appending an object's identifier to a time stamp value. In this way, within an object a first event precedes a second event when the first event has a time stamp that is less than that of the second event. Unfortunately, between objects, it is often difficult to assess an ordering since concurrent objects have their own local counter which may increment faster or slower than that of another object.

In another logical clock implementation, each object maintains a vector of integers that constitutes its local clock. A timestamp consists of the entire vector and each message sent includes an entire vector. Precedence order of two events is determined by comparing two vector time stamps in a similar fashion to that described by Reynal and Senghal as well as Fidge et al. in the above noted article. Concurrency can be determined in both cases.

A known implementation difficulty of a vector clock is the size and overhead of the time stamp. Characterising concurrency requires using vector time stamps of integers of at least size N when nothing is known about a computation except a number of objects, N. When N is large, the amount of time stamp data associated with each message and event becomes unacceptable.

There have been several approaches to reducing the overhead associated with vector time stamps. Singhal and Kshemkalyani, in the above noted reference reduce communication bandwidth by sending vector clock entries that have changed from a message last sent to a receiver in place of an entire vector. Each object maintains two additional vectors to store information between interactions. However, communication channels must be FIFO. In this approach, post-execution analysis is needed to recover the precedence relation between different messages sent to a same receiver.

Fowler and Zwaenepoel, in an above noted reference, describe a direct-dependency technique reducing communication overhead by maintaining precedence relations for direct interactions. A transitive component of the precedence relation is constructed by post-execution analysis. This allows an object's local clock to be an event counter. Each object maintains information relating to objects with which it directly communicates. Each message carries with it a sending object's event counter value from when the message was sent. The information that is recorded for each communication event is a sending object, receiving object, and appropriate event counters.

Valot, in an above noted reference, suggests that there is a trade-off between memory requirements and time stamp accuracy for precedence relations. She describes a family of time stamps, which she calls k-vectors, that can be tailored for particular analysis. Instead of allocating a position in the vector to a single object, a subset of available objects are each assigned a single position in the vector. The size of the k-vector is a number of subsets chosen. The appropriate selection of vector clock subsets provides better time stamp accuracy for a given vector size. However, a priori knowledge of simultaneous concurrency during execution is required for optimal assignment of an object to a position in the k-vector. This method, therefore, is only applicable to certain cases and not to general implementation.

Other logical clocks such as those proposed by Meldal, et al. require specific conditions or additional a priori knowledge to result in a reduced size time stamp or approximate the precedence relation. Using knowledge of fixed communication links between objects, this method provides a precedence ordering between messages arriving at a same object. This approach is used to determine precedence relations between messages arriving at a same object with overhead dependent upon network topology.

Interval clocks have been disclosed to approximate the precedence relation with a constant time stamp size. Interval clocks provide better results than scalar clocks having a same overhead. By using a bit array vector value instead of a counter, precedence relations are established by post-execution analysis. If only blocking RPC style communication is used then interval clocks describe the precedence relations with no additional post-execution analysis.

All of these logical clocks and all prior research only dealt with precedence causality. A scenario based causality is needed.

Monitoring and Tracing a Process

Event records are produced by monitoring a process. There are two aspects to monitoring. There is a monitoring system comprising means for storing data relating to process execution, and monitoring instrumentation, which using the monitoring system for recording of execution related information. The term monitor is used in its general sense to incorporate both these aspects.

An event record contains information about an application's activity and it consists of at least an event token and a time stamp. The time stamp is generated by a monitor and represents the acquisition time of the event record. The set of events is stored as an event trace.

A monitor collects information by at least one of sampling or tracing. Tracing consists of reporting all occurrences of an event within a certain interval of time. Tracing is synchronous with occurrence of events; it is performed when all occurrences of an event are known or when each occurrence of an event is followed by a certain action. With tracing, dynamic behaviour of a program is abstracted to a sequence of events. On the other hand, sampling is a collection of information upon request of the monitor. Optionally, sampling is asynchronous with the occurrence of an event; it is useful when an immediate reaction to an event is not necessary. Sampling allows only statistical statements about program behaviour. Profiling involves collecting execution counts or performing timing at the procedure, statement, or instruction level, using sampling or tracing.

Recorded information relating to events includes fields that record encapsulated data that follows a prescribed format. Some common approaches to specifying data to record are recording header data in the trace file to describe the fields; a self-describing trace format; an abstract information model based on entity-relationship descriptions; and a trace description language.

There is a large body of work in the prior art relating to monitoring of parallel programs but there is little research of monitoring distributed applications. There is an expectation in prior art literature that much of the parallel program monitoring research is applicable to a distributed application; however, it has been found that monitoring of distributed applications has a different set of requirements.

There are many different properties that a monitor may have. Several that have been identified in the literature are machine independence, using shadow processors, visualisation of performance metrics as they are gathered, pre-execution, automated instrumentation, instrumentation during execution, run-time enabling of event probes, event ordering by precision hardware time stamp, on-line program steering to control the program and monitoring overhead as it executes, and post-execution compensation for probe intrusion. Most of these monitoring systems sample and aggregate measurements using a specified criteria, and then present the resulting metrics either visually for analysis or to an expert system for evaluation.

Discussions of implementation mechanics of monitors are presented in the following articles:

P. Dauphin, R. Hoftnann, R. Klar, B. Mohr, A. Quick, M. Siegle, and F. Sotz. "ZM4/Simple: A general approach to performance measurement and evaluation of distributed systems." In T. Casavant and M. Singhal, editors, Readings in Distributed Computing Systems, pages 286–309. IEEE Computer Society Press, Los Alamitos, Calif., 1994.

M. Heath and J. Etheridge. "Visualizing the performance of parallel programs." IEEE Software, 8(5):29–39, September 1991;

M. J. Kaelbling and D. Ogle. "Minimizing monitoring costs: Choosing between tracing and sampling." 23rd International Hawaii Conference on System Sciences, Volume 1:314–320, January 1990;

B. P. Miller, M. D. Callaghan, J. M. Cargille, J. K. Hollingsworth, R. B. Irvin, K. L. Karavanic, K. Kunchithapadam, and T. Newhall. "The Paradyn parallel performance measurement tool." Computer, 28(11):37–46, November 1995;

D. M. Ogle, K. Schwan, and R. Snodgrass. "Application-dependent dynamic monitoring of distributed and parallel systems." IEEE Transactions on Parallel and Distributed Systems, 4(7):762–778, July 1993;

P. H. Worley. "A new PICL trace file format." Technical Report ORNLFM-12125, Oak Ridge National Laboratory, September 1992; and, J. Yan, S. Sanikkai, and P. Mehra. "Performance measurement, visualization and modeling of parallel and distributed programs using the AIMS toolkit." Software Practice and Experience, 25(4):429–46 1, April 1995.

PROBLEM SUMMARY

Though a tremendous amount of research and effort has been expended attempting to better monitor and analyse software execution, heretofore, no system exists for determining restricted forms of causality such as scenario causality. Scenario causality is a subset of precedence relationships and is indicative of a more direct causal link. Precedence, of course, is considered a requirement for scenario causality since current understandings of time indicate that it is unlikely that a later event can cause an earlier event to occur. It is desirable to determine forms of causality other than mere precedence of an application during execution. This would require solving the previously listed problems of "finding the scenario end", "scenario association," "the scenario event trigger", and "characterization of communication protocol." In so doing, causal connections detected are likely more significant and less numerous. It is also desirable to determine precedence for a multiprocessor or network based application during execution.

OBJECT OF THE INVENTION

It is an object of the invention to provide a method of recording information relating to some events during execution of a process, and of determining scenario causality and precedence causality for some of the events.

It is an object of the invention to provide a method of recording information relating to some events during execution of a distributed software application, and of determining scenario causality and precedence causality for some of the events.

It is an object of the invention to provide a method of recording information relating to some events during execution of a process, and of analysing the recorded information for the purpose of determining aspects of process execution flow.

SUMMARY OF THE INVENTION

In accordance with the invention there is provided for a system wherein information is recorded relating to events occurring during execution of a process, a method of determining a plurality of the events that are causally connected by precedence causality or scenario causality. The method comprises the steps of:

(a) translating the recorded information relating to the events to first graph language statements wherein one or more events is translated to a statement;

(b) determining from the statements information relating to process execution flow wherein each statement comprises information relating to a predetermined process execution flow; and, (c) based on the information relating to a predetermined process execution flow, determining, for each of a plurality of caused events, a plurality of events from the events that precede each event from the plurality of caused events and are each scenario causally or precedence causally connected to said event from the plurality of caused events.

In accordance with the invention there is provided a method of determining a plurality of the events that are scenario causally or precedence causally connected comprising the steps of:

during execution of an event,
  recording process related information,
  recording object related information, and
  recording event related information;

using the process related information and the object related information for a plurality of events, translating the recorded information to a graph language substantially indicative of scenario and potential causal connections between events; and, providing information based on the causal connections between events.

In accordance with the invention there is provided a method of determining a plurality of events that are scenario causally or precedence causally connected for use with recorded information relating to events occurring during execution of a process. The method comprises the steps of:

analysing the recorded information to determine a partial order of events from each of two relative perspectives;

combining the two partial orders of events to produce information relating to some forms of scenario and potential causality. In accordance with the invention there is provided a method of determining a plurality of the events that are scenario causally or precedence causally connected comprising the steps of:

providing a process for execution;

instrumenting the process for monitoring of an execution of the process;

executing the instrumented process to produce a trace of the process execution;

transforming the trace of the process execution into a plurality of scenario graph language statements according to a plurality of predetermined rules to reverse engineer scenarios;

transforming the scenario graph language statements into a scenario event graph for analysis, and, transforming the scenario event graph(s) into a domain specific model for analysis in another domain.

BRIEF DESCRIPTION OF THE DRAWINGS

Exemplary embodiments of the invention will now be described in conjunction with the following drawings, in which.

DETAILED DESCRIPTION OF THE INVENTION

Figure 1A:
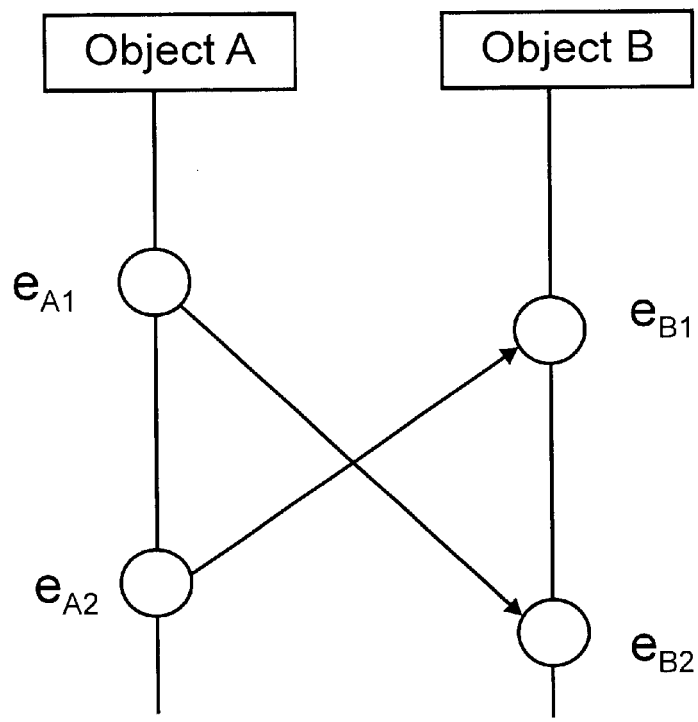
FIG. 1a is a simplified scenario diagram.
Figure 1B:
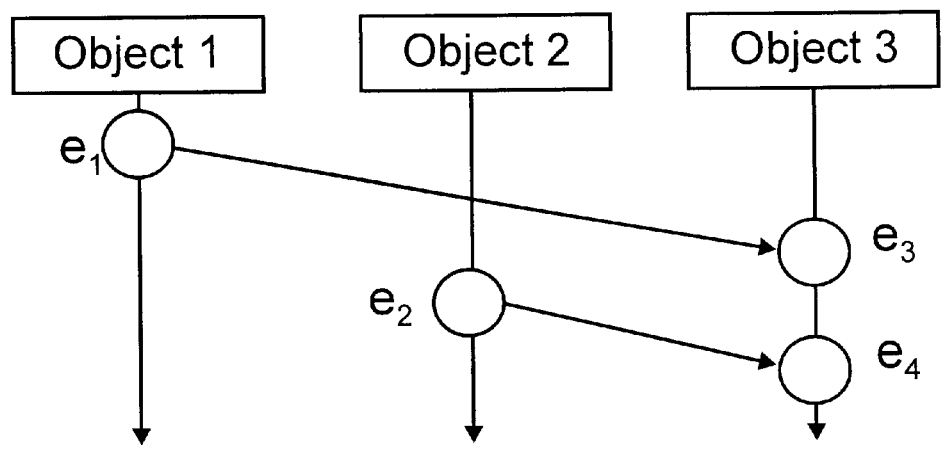
FIG. 1b is another simplified scenario diagram.

A sequentially executing software component that may execute concurrently with other components is referred to as an object throughout this specification and the claims, which follow.

Software execution models of distributed and concurrent systems characterise objects and their interactions in the context of the process that they are part of, fully describing a scenario of execution of an application. Software execution models are design aids that are used during the development of a software application. A software execution model (hereafter simply "model") characterizes high-level aspects of an application's execution for analysis. A forward engineering model will specify intended behavior (e.g., specifying interaction diagrams such as use-cases, sequence diagram, collaboration diagram). Interactions between objects are important because they effect parallelism and resource contention experienced during execution when, for example, a heavily used object queues arriving requests and becomes a bottleneck. During the later phases of development, models are constructed to characterize the realized behavior, to aid in program understanding, re-engineering, reuse, performance analysis, and debugging. Often these realized models are mental pictures that the developer constructs from user requirements, design documents, source code examination, and, most importantly, experiences with the system. The realized models are critical for investigating differences between the specified behavior and the observed behavior. Manually reverse engineering a model from an actual execution of a small software application is relatively easy but it is expensive, difficult, and uncertain for a large or dynamic application. A technique is needed to generate models of realized behavior and object-oriented methodologies need to be adapted to incorporate the realized models.

Performance models are a type of software execution model for optimisation purposes. A performance model of distributed and concurrent systems characterise objects and their interactions. Interactions between objects are important because they effect parallelism and resource contention experienced during execution when, for example, a heavily used object queues arriving requests and becomes a bottleneck. The Layered Queuing Network (LQN) model has been proposed to evaluate such processes. The LQN model extends queuing network models to include contention effects for software resources such as server objects, as well as contention for hardware devices. It is appropriate for assessing performance of many kinds of distributed systems, including client-server applications, peer-to-peer applications, communications switching software, transaction processing systems, and systems based on middleware software technologies. Using the invention for this purpose is described in both:

C. E. Hrischuk. Trace-based Load Characterization for the Automated Development of Software Performance Models. Ph.D. thesis, Carleton University, Ottawa, Canada, 1998.

C. M. Woodside, C. Hrischuk, B. Selic, S. Bayarov. "Automated performance modelling of software generated by a design environment." Performance Evaluation, vol. 45:1, pages 107–123, 2001.

Figure 1C:
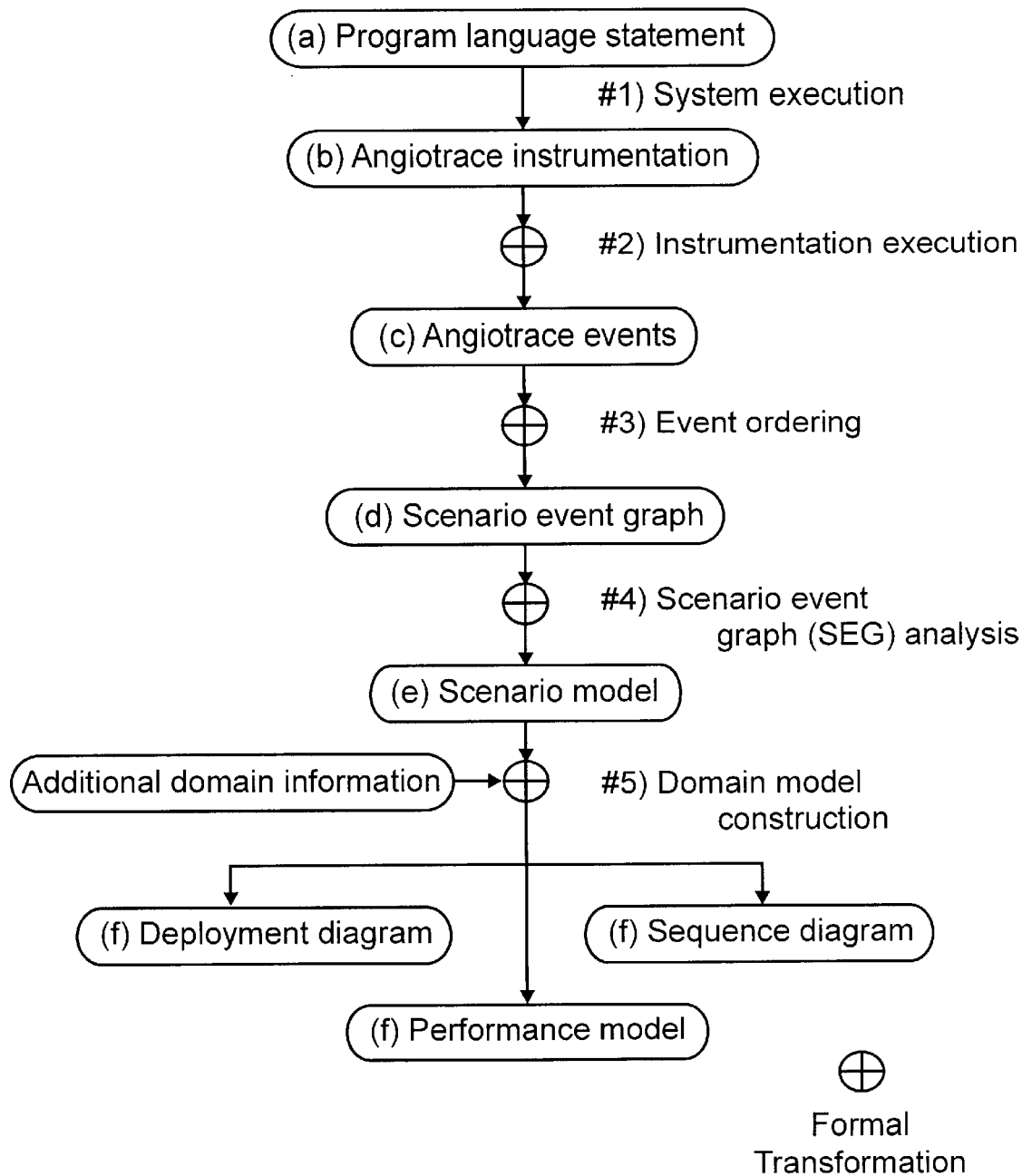
FIG. 1c is a high-level block diagram of a method according to the invention.

Referring to FIG. 1c, a high-level block diagram of a method according to the invention is shown. A language statement in the form of a design statement or executable code is instrumented to support monitoring of the design or executable during simulation or execution. The instrumentation interacts with storage devices and other system resources to provide tracing of the simulation of a design in the form of an abstract execution, simulation, or emulation of the execution of an executable. Once traced, the trace results form an angiotrace. The angiotrace is a particular form of trace as defined hereinbelow. From the angio trace is determined a plurality of scenario graph language statements that characterise the observed scenario's behaviour. In an embodiment, the scenario graph language is, as disclosed herein, "scenario event graph." From the scenario graph language statements, domain specific models are formed through transformation. Since a scenario event graph language description is substantially indicative of scenario and potential causality, the domain specific models may take a number of forms. These include performance models, resource utilisation models, design models, execution flow models, and so forth. By determining design models, an executable program is verifiable against design requirements from which it is derived. Further information can be found in C. Hrischuk. "A Model Making Automation Process (MMAP) using a Graph Grammar Formalism". *Proceedings of the Theory and Application of Graph Transformations*, 1999.

Figure 2A:
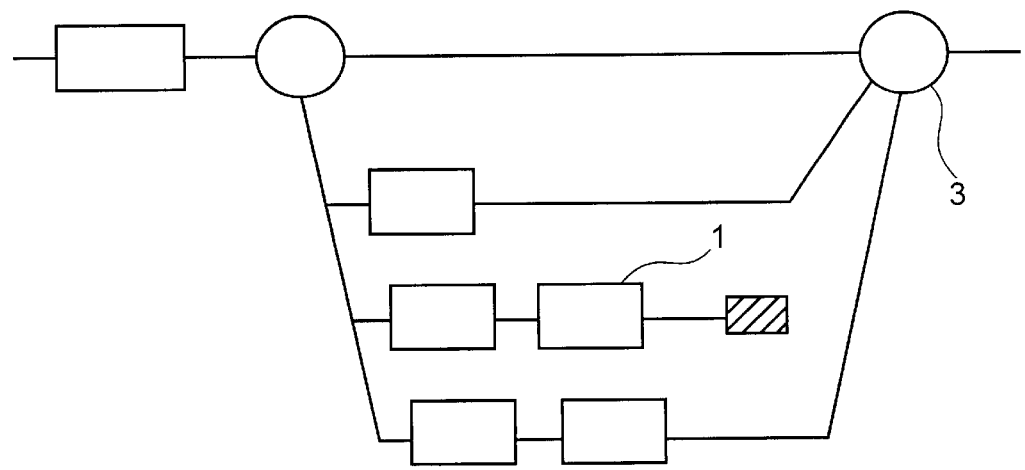
FIGS. 2a and 2b are simplified flow diagrams of code execution.
Figure 2B:
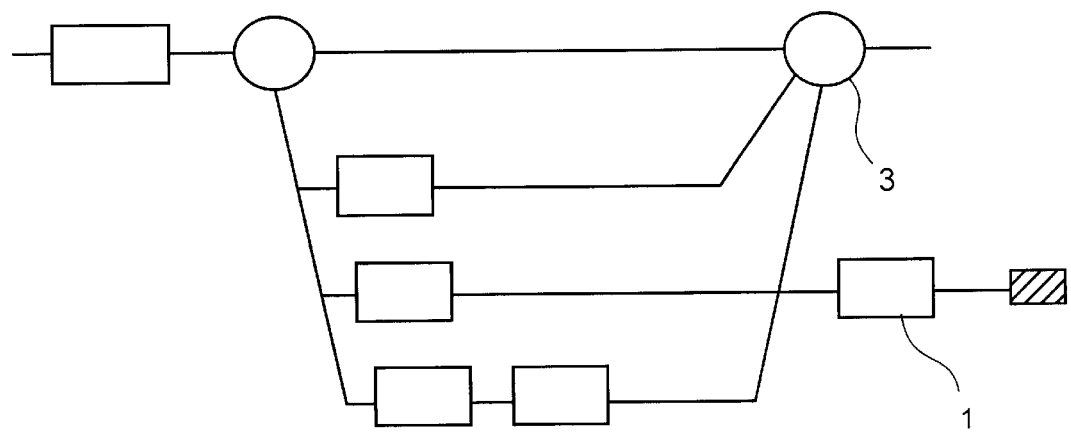

Referring to FIGS. 2a and 2b, simplified flow diagrams of code execution are shown. Code statements represented by circles represent fork events and join events. Code statements represented by solid boxes represent terminals and hollow boxes represent default events. Lines joining code statement representations are indicative of potential causality. The flow diagrams are shown in time with an earlier time to the left of a later time. The two flow diagrams shown in FIGS. 2a and 2b are of identical executable code executed at two different times. Upon a brief review of the two flow diagrams, it is evident that a code statement 1 is executed at two different times. In fact, this does not effect execution of the process because the code statement 1 is not causally connected to the join code statement 3. Unfortunately, when evaluating a system based solely on precedence, it is difficult to determine when causally identical situations such as that shown in FIGS. 2a and 2b may occur.

In fact, though a flow diagram generated from the system during testing may always be similar to that of FIG. 2a, the flow diagram of FIG. 2b is an acceptable execution of the process characterised by the two flow diagrams and may occur at some later time. It is clearly advantageous to identify flow related issues such as these and to test out their correctness in light of desired design parameters. According to the present invention, a method of evaluating and transforming recorded information relating to code statements into process flow information and subsequently into other information is provided.

Scenario Causality

Prior art research into implementations for logical clocks has proven useful for ordering events but other than precedence causality, characterisation of scenario causality has heretofore been elusive.

Prior to discussing scenario event graph and its use for determining causality other than precedence, causality should be defined. In order to understand causality, some forms of causality are outlined below. The terms as defined hereinbelow associated with each form of causality are used throughout this specification and the claims.

Figure 3:
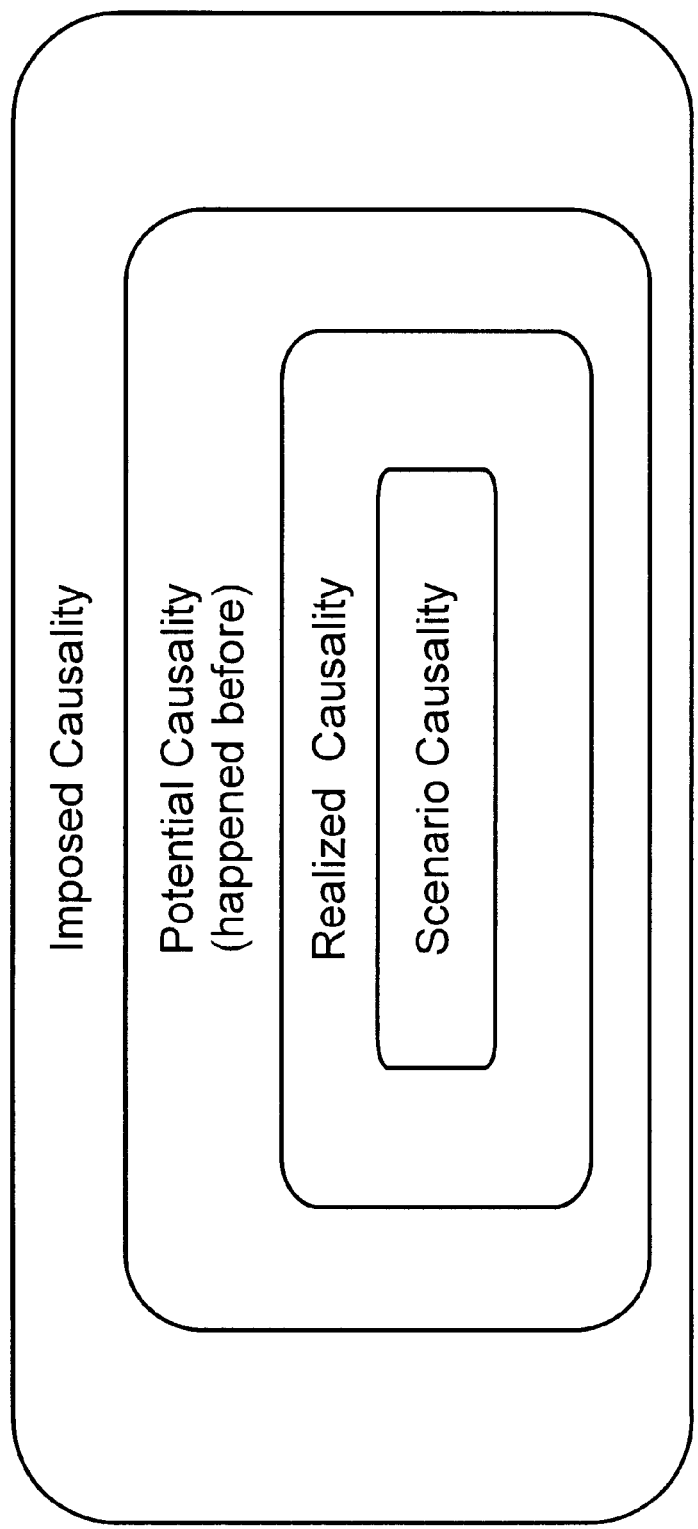
FIG. 3 is a simplified set diagram of different forms of known causality.

Precedence causality in the form of precedence relations are a loose form of causality inferring that a first event occurs before a second event during an execution. This form of causality is known in the art and is a common object of prior art systems. Referring to FIG. 3 a simplified set diagram of different forms of known causality is shown. As is evident from the diagram, imposed causality is inclusive of several other forms of causality.

Realised causality is a term referring to an event ordering that is consistent with both purpose and an execution. In theory, when a process is correctly designed and implemented, realised causality reflects both. Realised causality is summarised as a first event is an intended cause of a second event if the second event cannot occur unless the first event has already occurred. Of course, when verification of process implementation against design criteria is intended and process implementation is potentially incorrect the statement "cannot" is modified to "should not." Recovering realised causality from prior art post-execution traces is impossible because it necessitates knowledge of the process implementation in the form of software code of each object, the initial value of variables, and the execution environment.

According to the present invention a form of causality referred to as scenario causality is determined. Scenario causality includes forms of causality other than precedence but does not truly reflect realised causality in every instance. This is indicated in FIG. 3 wherein scenario causality is a subset of realised causality. Certain assumptions and limitations allow for a broader applicability of the method of the present invention as discussed below.

Different types of logical clocks result in different causal ordering of events which may exclude important relationships. Although each ordering is consistent with precedence relations, some orderings are preferable for some applications. For example, vector based logical clocks allow for a determination of potential causality.

Precedence causality provides a partial ordering between events that respects event ordering during execution. Precedence causality is characterised as a future event being incapable of influencing the past. A vector clock characterises precedence causality because the event ordering is consistent with system execution. Precedence causality is a weak approximation or characterisation of realised causality because it results in all previous events being potential causes for later events. This is a consequence of causality being deduced solely from precedence relations.

Imposed causality is obtained when the ordering between events is imposed by an algorithm, and is not constrained to event execution order. A scalar clock is an example of a logical clock resulting in a determination of imposed causality. Because a clock with imposed causality may include all other clocks as special cases, imposed causality is shown as the largest set in FIG. 3

The difference between precedence causality and realised causality is well known but many prior art methods for determining causality ignore the difference. Examples of some of these include the following papers:

D. Bryan. "An algebraic specification of the partial orders generated by concurrent Ada computations." In Proceedings of Tri-Ada, pages 225–241, New York, N.Y., 1989. A.C.M. Press;

C. Fidge. "Partial orders for parallel debugging." In Proceedings of ACM SIGPLAN/SIGOPS Workshop on Parallel and Distributed Debugging, pages 183–194, 1988;

D. P. Helmbold, C. E. McDowell, and J. Z. Wang. "Determining possible event orders by analyzing sequential traces." IEEE Transactions on Parallel and Distributed Systems, 4(7):827–839, July 1993;

M. Raynal and M. Singhal. "Logical time: Capturing causality in distributed systems." Computer, 29(2):49–56, February 1996;

A. Schiper, J. Eggli, and A. Sandoz. "A new algorithm to implement causal ordering." In Proceedings $3^{rd}$ International Workshop on Distributed Algorithms, number 392 in Lecture Notes in Computer Science, pages 219–232. Springer-Verlag, Berlin, 1989; and, G. Winskel. "An introduction to event structures." In J. W. de Bakker, W. P. de Roever, and G. Rozenberg, editors, Linear Time, Branching Time and Partial Order in Logics and Models for Concurrency, pages 364–397. Springer-Verlag, Berlin, 1989.

Scenario causality is a subset of realised causality, including only those causal relationships for each application's execution. Whereas imposed and precedence causality are overly liberal inclusive approximations of realised causality, scenario causality is an achievable conservative approximation of realised causality. Scenario causality limits an event's influence to those future application events it can effect. A criteria, called the scenario ordering relation, is used to deduce scenario causality from observations of the execution. The scenario ordering relation, according to the invention, solves the previously listed limitations of scenario causality by limiting the effects of an event to both the unit of software modularity in the form of object level effects and process of which the event forms part. This is useful because it reflects the context with which an event is associated, namely a software module and its process. The scenario ordering relation is described as: "a first event is a cause of a second event if there is a sequence of events from the first event to the second event in the same process."

In the specification and claims that follow, causality refers to conservative estimations of causality. Alternatively stated, causality as used herein refers to events that are scenario causal and not merely precedence causal. When precedence causality is intended, that term or a synonym thereof is used.

Figure 4:
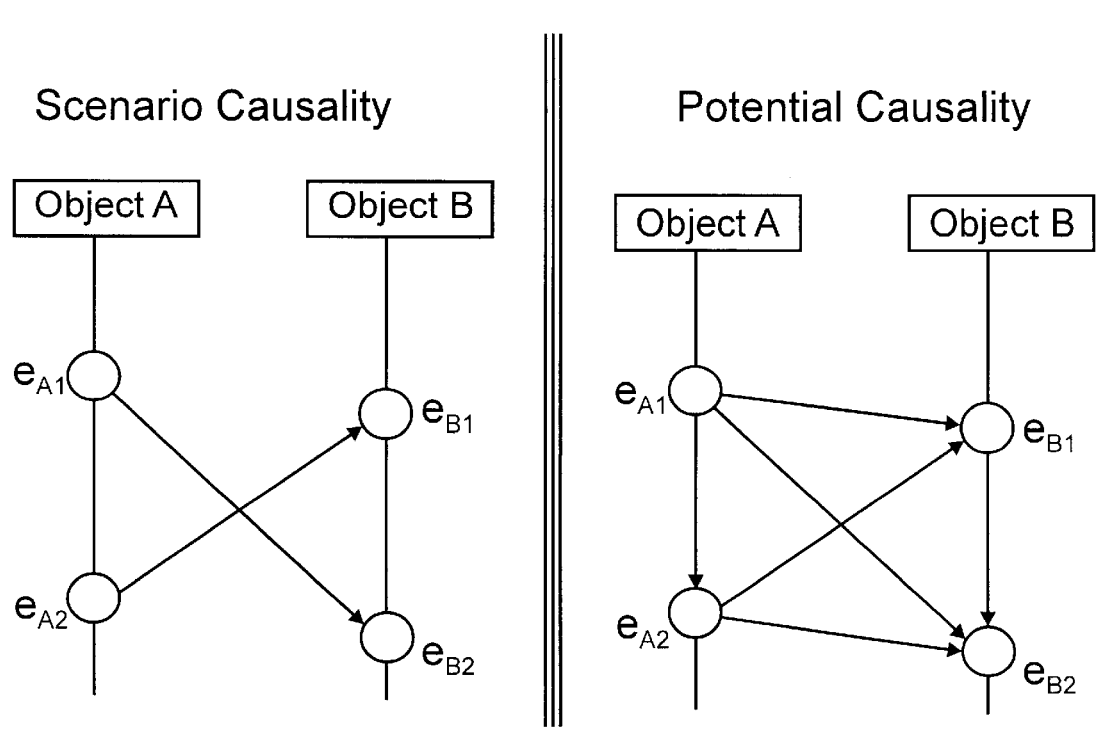
FIG. 4 is a diagram showing a simple example of a difference between scenario causality, and potential causality.

In the timing diagram of FIG. 4, there are two distributed applications. Each application consists of Object A sending a message to Object B. As shown, two independent external events cause each application to execute, recording the events of the first application as and the events of the second application as . However, as the scenario causal ordering shows in FIG. 4, there is a delay such that the second message sent by Object A (event) overtakes the first message it has sent (event ). The precedence ordering of the events is shown in FIG. 1c, including the transitive ordering components. The precedence ordering includes the additional event orderings of which are not causal orderings because the scenarios are independent.

Figure 5:
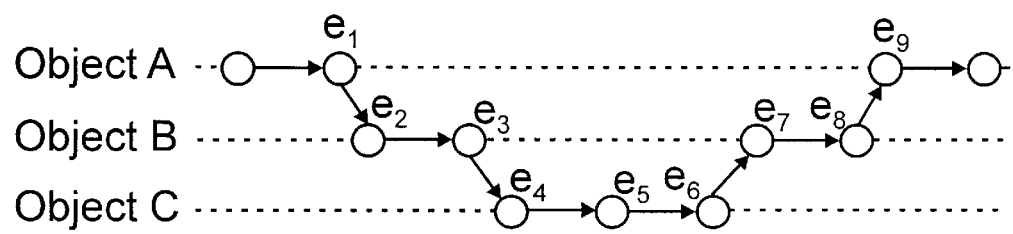
FIG. 5 is a flow diagram showing an RPC having two blocking interactions, one nested within the other.

It is useful to identify blocking of objects when analysing system execution for race detection and system visualisation among other applications; however, a classical partial-order model has difficulty characterising object blocking because communications are recorded as asynchronous communications. Object blocking introduced by blocking communication mechanisms, such as the Remote Procedure Call (RPC), is not apparent within the classical model. Analysis is further complicated when blocking interactions are nested. For example in the flow diagram of FIG. 5, an RPC has two blocking interactions, one nested within the other. Object A initiates an RPC and blocks at event $e_1$, and the nested blocking interaction is initiated by Object B at event $e_3$. One approach to identifying object blocking is to augment time stamps recorded through monitoring, in particular metrication within the time stamps, with information about a communication mechanism, as is attempted in some debugging applications. Other approaches modify the precedence relation. The topology of the scenario event graph language according to the invention directly characterises object blocking by labelling the elements of blocking and non-blocking communications differently with different events. Then a causal chain of events through an RPC is immediately identifiable. According to the invention, a characterisation of message-based synchronisation between objects is performed.

Performance model construction using the model making automation process (MMAP)[3] comprises three steps. First an appropriate trace of execution is recorded. Such a trace is referred to as an angio trace throughout this document and the claims that follow. Then the trace is analysed to produce scenario event graph that characterises the execution of the scenario: the involved objects, their individual activities, and their interactions with each other. A scenario event graph forms a scenario model. Thirdly, the scenario event graphs are combined to make a performance model that merges several scenario models and additional configuration information necessary to determine performance.

[3]Previously called Trace Based Load Characterization.

There are several benefits to using MMAP as opposed to a "source code examination" approach for constructing models. Traces incorporate dynamic details of a design that are difficult to determine from source code or documentation. Some of these are data dependent branching, identity of objects involved in anonymous or dynamically bound interactions, and involvement of polymorphism and inheritance hierarchy of an object-based system. Automated trace processing results in more accurate performance model construction at a lower cost because a larger volume of details is included during model development. An area where automation has a decided advantage is for correctly identifying interaction types. For example, MMAP identifies a synchronous interaction constructed from asynchronous messages. This is important when the nature of an interaction cannot be explicitly identified in a trace. Optionally, MMAP is used to model a production version of a software process, to provide full life-cycle support for modelling.

Figure 6:
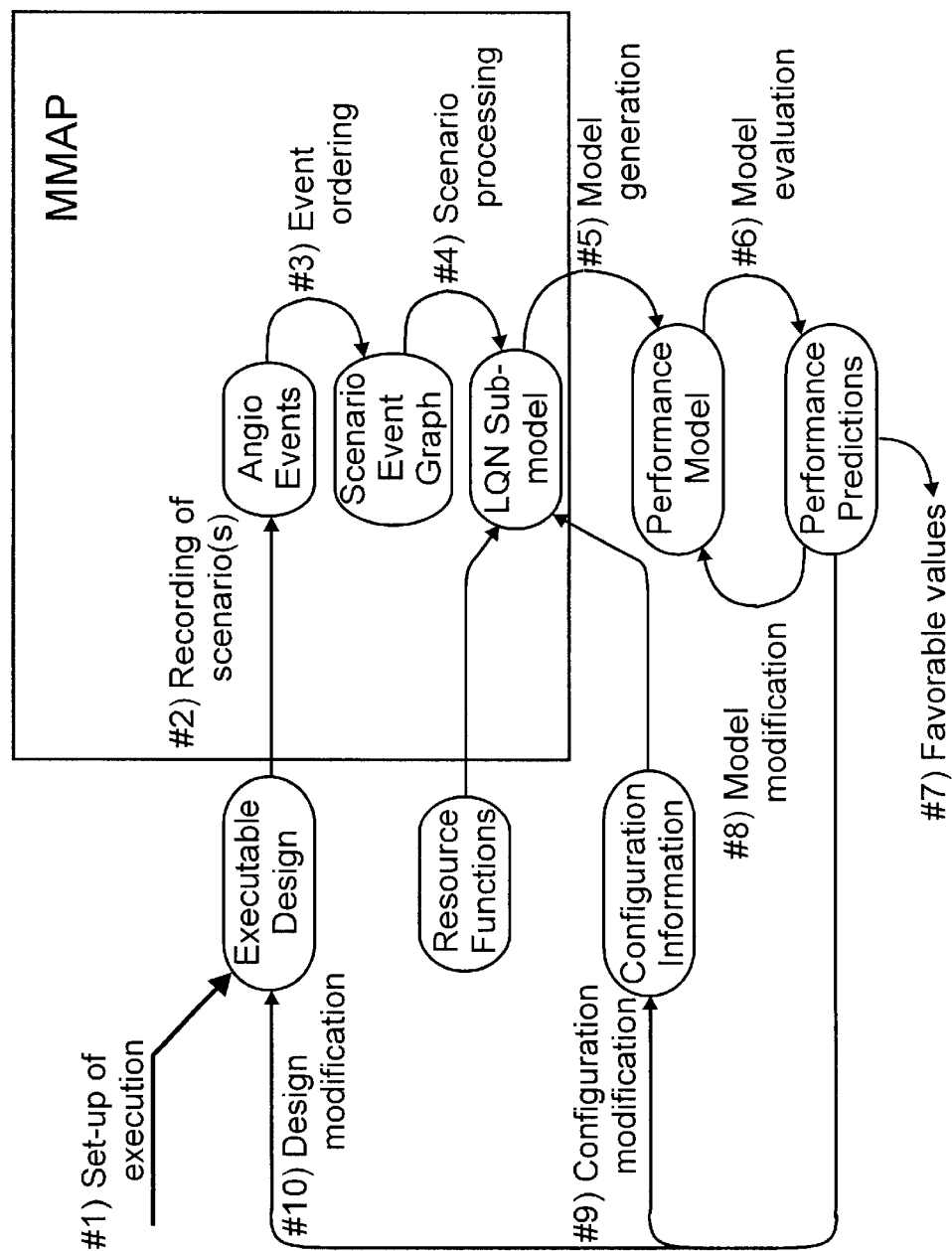
FIG. 6 is a diagram showing the steps in applying MMAP in a performance engineering context.

The steps in applying MMAP in a performance engineering context are shown in FIG. 6. A first step is to select scenarios which are important for performance modelling and to add instrumentation to identify where the execution of each scenario begins and ends. In a second step, angiotrace events are recorded during the execution of a scenario. For analysis purposes the events of a trace are reordered into an intermediate format that is then processed into an LQN sub-model. The user completes the LQN construction in a fifth step by combining several LQN sub-models with system configuration information.

Software Execution Tracing

In tracing a process in the form of a software process during execution, it is preferable to have a predetermined set of desired information. Such a set of desired information is determined in dependence upon information sought through processing of the trace results. Essentially, for use in the present invention, a trace must capture, in an automated fashion, information sufficient for determining scenario causality from a distributed application's execution history.

In order to record sufficient information regarding software process execution, angio tracing is employed. Angio tracing according to the invention identifies scenario and potential precedence relationships between recorded events of an application and properly characterises concurrency. Angio tracing according to the invention characterises communication protocol elements in the form of blocking request initiation, non-blocking request initiation, request acceptance, synchronisation acceptance, sending a reply to a blocking request initiation, and acceptance of a reply. Angio tracing supports integration of information from a heterogeneous environment because it is independent of implementation technology, execution environment, and monitoring approach. Optionally, multiple angio traces are recorded simultaneously. Automated trace analysis is possible because angio tracing according to an embodiment is based on a formal model.

Angio tracing has been successfully implemented in many environments. Software monitoring is a preferable means for characterising a distributed application. An angio trace has at least a logical clock which can serve many purposes. The approach adopted by angio tracing is to provide an event format which includes time stamp information and user defined application data payload.

Angio traces are extractable from a plurality of different sources at various steps of the development. Examples of sources of an angio trace include annotated specifications in the form of use-cases and Message Sequence Charts, functional prototypes, detailed simulations, and an executable production system. Successful experiments have been conducted with several of these sources. In the embodiment described below, angio traces are derived from a design prototype environment; the method is applicable with necessary modifications to other sources.

There are four requirements limiting the application of parallel program monitoring research to distributed applications. First, hardware or hybrid monitoring of a distributed application is not possible because of the geographically dispersed environment. Therefore, a software monitor approach must be adopted Secondly, a strategy for minimising tracing overhead is required. Parallel program monitors have used several strategies. The simplest strategy is to enable trace sensors at run-time. A more elaborate strategy is the on-line control of the program and monitoring overhead as it executes.

Examples are used in Falcon, Paradyn, and Pablo. These strategies are difficult to apply to distributed applications because software components are not known in advance, making instrumentation adjustments a priori impossible. Angio tracing uses a different strategy; event recording is enabled during execution by application during execution and other applications which are executing simultaneously do not necessarily have events recorded.

When distributed applications are considered in isolation, tracing should be used; however, most parallel program monitors use sampling. Sampling is justified in a parallel programming environment because parallel applications have a static structure and run in isolation. This is not true of distributed applications, where the sampled data values can be attributed to incorrect applications, since applications execute simultaneously and share resources. Angio tracing is tailored for monitoring distributed applications by tracing.

Another concern is the need for ordering recorded events once tracing is done. Ordering recorded events in a distributed system is difficult for two reasons. First, a global clock is not available because the system is geographically dispersed. Secondly, perfectly synchronised clocks local to each object are not possible because of poor clock granularity, poor clock synchronisation, clock drift, or unpredictable communication delay. This is well known in the prior art.

Although the precedence relation is useful for system-wide analysis it is not useful for analysing execution of a distributed application. The first limitation of the precedence relation is that it does not distinguish between blocking and non-blocking communication protocols; it assumes all communication is non-blocking. Secondly, it introduces ordering relationships between events from different scenarios, treating independent scenarios as if they were part of a single, system-wide scenarios. As mentioned previously, this is because the precedence relation does not distinguish between different scenarios.

Angio tracing overcomes these limitations by using a special scenario precedence ordering relation that also recovers potential causality. This precedence ordering relation is used to answer a particular class of questions, such as: "Does an event happen before another event in scenario A?" Whereas, the precedence ordering answers questions such as, "Did an event occur before another event, in the system?"

Angio tracing is useful for monitoring a distributed system which heretofore has been a difficult environment to monitor. A distributed system is composed of geographically dispersed, heterogeneous hardware with a set of executing, concurrent software objects, which are referred to as objects. A distributed application is a subset of objects that interact in a dynamic, coordinated fashion solely by point-to-point message communication with finite but unpredictable delay. The communication protocol is assumed to be reliable and first in first out (FIFO) ordering of message delivery is not assured.

A system that executes distributed applications differs from a classical distributed system model. Some differences are: several different applications or instances of the same application can execute simultaneously sharing the software resources (objects) and hardware resources; object execution is periodic, beginning when a service request message is accepted and ending when the service request is satisfied; an object's lifetime may extend beyond that of an application; an object can be added or removed so the software structure is dynamic; and, communication links between objects are dynamically established. The communication at least one of blocking (i.e., Remote Procedure Call) and non-blocking (i.e., asynchronous). DCE RPC, CORBA, Java, mobile agents, HTTP requests, and web services are examples of technologies used to build distributed applications. Angio tracing accommodates the above noted differences and supports tracing using these technologies as well as others.

Angio tracing characterises execution of a distributed application independent of other executing applications. To ensure that trace event information properly captures concurrency and event ordering, angio tracing was derived from a formal model called the scenario event graph. The scenario event graph is a scenario graph language, with typed nodes and edges, which fully describe an execution of an application or the behaviour cycles in an application that are independent of each other. The relationship between the scenario event graph language and angio tracing is significant in implementing a method according to the invention. Essentially, appropriate event recording requires some knowledge of information necessary to produce a desired output. The scenario event graph language provides a formal model from which many different output views or data sets are determinable and, therefore the scenario event graph language is a desirable model. As set out below, angio tracing supports the formation of models in the scenario event graph language. The scenario event graph language is described in more detail below.

Properties of angio tracing which make it unique follow. It is a new type of logical clock allowing reconstruction of a scenario and precedence causal ordering of events for each distributed application is used. An angio trace is capable of transformation for analysis into a model using the scenario event graph language. For example, an angio trace is used to automatically generate a performance model of a distributed application. An angio trace characterises communication protocol elements.

Angio tracing, as herein disclosed, is successfully implemented in experimental systems in the following environments: a functional prototyping environment, a commercial prototyping environment, a distributed software system simulator called Parasol, coarse-grained UNIX operating system processes, in the DCE RPC environment using data collected by the POET debugger, and on the Microsoft Windows platform.

Event Graph Types

Three approaches to formally characterising the execution of a distributed application are: a partial order, a regular expression language, or a graph language. A partial order characterises concurrency but it is difficult to characterise blocking interactions or synchronisation between objects. The most frequently used partial ordering relation, the precedence relation, is discussed in detail above.

A regular expression language characterises blocking and synchronisation but it loses information about software structure and concurrency because applications are described by event interleaving. Two regular expression languages are path expressions and flow expressions.

The scenario event graph is a graph language for characterising a distributed application that overcomes limitations of prior art characterisation methods. The scenario event graph language has labelled nodes that are types of application events and labelled, directed edges that are different types of causal relationships. It characterises communication protocol elements and object concurrency during application, and system execution. The communication protocol elements are: blocking request initiation, non-blocking request initiation, request acceptance, synchronisation acceptance, sending a reply to a blocking request initiation, and acceptance of the reply.

The scenario event graph's implementation of scenario causality is fully described in:

C. E. Hrischuk. Trace-based Load Characterization for the Automated Development of Software Performance Models. Ph.D. thesis, Carleton University, Ottawa, Canada, 1998.

C. Hrischuk, C. M. Woodside. "Logical clock requirements for reverse engineering scenarios from a distributed system." Accepted for publication in IEEE Trans. on Software Engineering.

The scenario event graph language is the basis for the angio trace specification because there is a correspondence between elements of the graph language and the angio-trace specification. To better understand the properties of angio tracing a brief description of the scenario event graph language is given here.

The scenario event graph language combines two types of graphs to describe object, process, and system execution. It characterises a process's execution as a process event graph. Object execution is characterised by an object event graph. According to the scenario event graph language these two points of view are combined as a Scenario Event Graph (SEG), which has more information than the graphs considered in isolation. The graphs are causal models, where the nodes are recorded events and an edge identifies a causal relationship between two nodes.

Object Event Graph

The object event graph characterises periodic execution of an object. An object satisfies a service requests of other objects one at a time, with the subsequent processing of each request being described as a service period. An object event graph consists of a sequence of linear sub-graphs, one for each service period. Each service period is also a linear sub-graph of object activities. An object event graph has a beginning, but it may not have an end; this occurs, for example, when an object continuously operates.

An object event graph is composed of two types of nodes and edges as follows:

"Period start" node: the object has started a new service request period and this is the first node.

"Object activity" node: a node that represents an activity that the object performed.

"Object's next node" edge: its target is the node in the same object period that succeeds the source node.

"Object's next period" edge: its source is the last node of an object's period and its target is the period start node of the object's next service period.

The target of an object's next period edge is a service period in the same process or in a different process. So, the next period edge sometimes connects different process event graph's together characterising system execution, provided there are objects which are common to the processes.

There are four types of roles that an object assumes in a process. A role limits node connection types as indicated by the column in Table 1 called "Allowed Protocol Role". The first role type is an initiating object, where requests for services from other objects are communicated. The second role type is as a responding object, where acceptance of a service request from an initiating object occurs and the service request is satisfied. The third role type is as a forwarding object, where a service request is accepted, some processing is performed, and then the service request is forwarded to another forwarding object for further processing. The fourth role type is as a replier object, where a responding object sends a reply back to a blocked initiating object to indicate that its service request has been satisfied.

Process Event Graph

A process event graph characterises execution of a process as an attributed, edge-labelled, binary, finite, directed, acyclic graph. Each concurrent thread of execution is a linear sub-graph called a process thread. Each process thread is also a linear sub-graph of process activities. For example, when an application has several objects interacting by blocking RPC, the process event graph is a single process thread because there is no concurrent execution. When a process event graph has concurrent process threads, special node and edge types are used to characterise causal relationships between process threads.

The process event graph node types are as set out below.

"External" node: a marker for the external initiation of a process. a process may have more than one external node.

"Thread begin" node begins a process thread.

"Process activity" node has an attribute to store process information.

"And-fork" node forks a new process thread to characterise the introduction of logical concurrency.

"And-join" node joins two process threads into a single thread of execution.

"Thread end" node finishes a process thread.

All of the node types, except the activity node type, are considered atomic, having no duration, allowing chaining of nodes to describe complex interactions between objects.

The different edge types of a process event graph are as follows:

"Start the process" edge (st): its source is an external node and its target is the thread begin node of the first process thread.

"Process thread's next node" edge: its target is the next node in the same process thread that succeeds the source node.

"Process thread's fork" edge (f): its source is an and-fork node and its target is the thread begin node of the forked thread.

The default edge type is the "Process thread's next node" edge which is abbreviated to next process edge.

The execution of a single program statement is described by a sub-graph to separate a program statement identifier from its effect on the process behaviour. To ensure consistency of representation, several rules govern introduction of a sub-graph. First, if a program statement is characterised by a sub-graph of and-fork node(s) and an activity node, the activity node is the first node in the sub-graph. Conversely, if a program statement is characterised by an activity node with a begin node or and-join node(s), the activity node is the last node in the sub-graph.

Scenario Event Graph (SEG)

A scenario event graph combines a process event graph with several object event subgraphs. We start from the process subgraph of the scenario, and superpose those parts of the object subgraphs representing service periods within the scenario as overlays. Two nodes representing the same event are merged, and have a dual type, one type for the scenario subgraph and one for the object subgraph. Similarly where an edge exists in both the scenario and the object subgraphs it has a dual type, one type for each.

Figure 7:
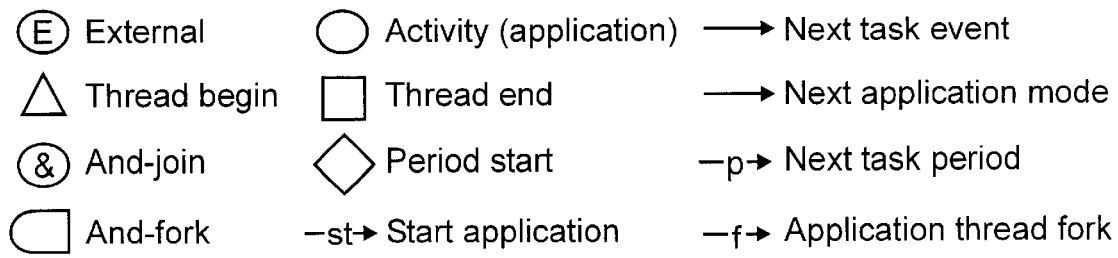
FIG. 7 is a diagram of symbols for use in process event graphs according to the invention.
Figure 8:
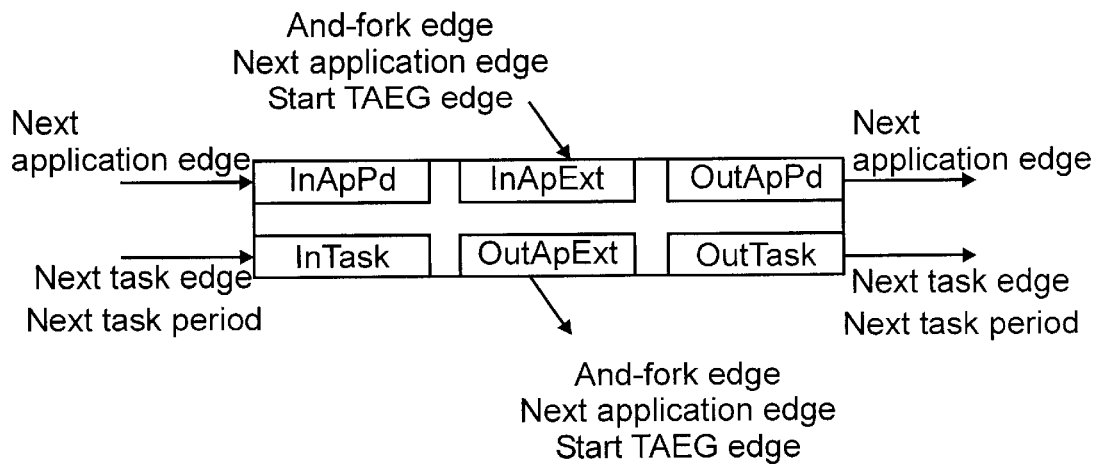
FIG. 8 shows a general representation of a Scenario Event Graph (SEG) node as a six-port building block.

Symbols of the SEG are shown in FIG. 7. No icon is provided for the default node type, object activity node. Figures showing SEGs follow several conventions: time proceeds from left to right, and the consecutive nodes of an object are at the same vertical level.

The interpretation of a SEG restrict the manner in which nodes and edges are connected. Causal relationships during execution restrict the node and edge connections. For completeness, object period start edges are shown where they may occur.

RPC, synchronisation, and asynchronous communication protocols are also characterised by the following elements:

Blocking request initiation: An object cannot proceed until it receives a reply to a request it has just made;

Non-blocking request initiation: An initiating or forwarding object makes a service request to another object and the initiating object does not block to wait for a reply;

Request acceptance: A blocked responding object accepts a new service request and begins a new period;

Synchronisation acceptance: A responding object is already processing a service request but it is blocked, waiting to accept another message to continue the service;

Sending a reply to a blocking request: A replier object sends the reply to the blocked initiating object; and, Acceptance of a reply: A blocked initiating object receives the reply and continues execution.

With a formal specification of the scenario event graph language, a deduction of the information required to generate a scenario event graph model from a trace is possible. Trace requirements are discussed below with reference to angio tracing.

A Global Event Graph

Finally, where the event records include many scenarios, a global event graph is defined as the superposition of all of the object event graphs and scenario event graphs in the system.

The global event graph is important because it means several scenario causal description can be combined to characterize precedence causality. However, precedence causality cannot characterize scenario causality.

Angio Trace

An angio trace provides a precedence ordering of separate sets of execution related information—object level information and process level information. These are easily visualised as two graphs related to each of two times tamp values. The ordering of events is achieved by a set of ordering relations and event predicates. An event predicate identifies a type of an event and it serves as guard conditions for selecting an ordering relation. Once an ordering relation is selected, event ordering for two events is established. Essentially, during tracing sufficient information is collected to allow for determination of event ordering according to scenario and precedence causality.

An angio trace is defined as: $G_{Trace}=(N, \Sigma_n, M_n, P, \Omega)$ where

N is a set of recorded events;

$\Sigma_n$ is the alphabet of event time stamps;

$M_n:N \rightarrow \Sigma_n$ are the rules for assigning time stamp values to events;

P is a set of event predicates ; and $\Omega$ is the mapping of a predicate to one, or more, valid ordering relations.

To develop the two graphs, each angio trace event records an object time stamp for the object event graph and a process time stamp for the process event graph. Before describing each of these time stamp values, the logical clock requirements satisfied thereby are outlined.

There are three properties that the time stamp values have when used as a logical clock. Firstly, each time stamp has a unique value or the event ordering relations provide a default scheme for ordering events with identical time stamps. According to an embodiment of the invention each time stamp value is unique. Secondly, the time stamp values are monatonically increasing, although there may be gaps in the time stamp values. For example, the process time stamps are sequentially indexed so that missing events are easily detected. The object time stamp value is allowed to have gaps. An additional property needed for angio tracing is that the two time stamp values of successive events in the same object are synchronised: two events A and B cannot have time stamp values where the object time stamps indicate that event A occurred before event B and the process time stamp indicates that event A occurred after event B.

An object time stamp consists of a unique object identifier for each object event graph; an object period index that is a counter ordering service periods of an object; and an object event index that is a value ordering events within a service period.

Object time stamp monatonicity is a result of period and event index values always increasing. The object identifier provides uniqueness of the time stamp values.

A process time stamp consists of a unique process name that associates an event with an application's scenario; a unique process thread identifier that is assigned as a process thread begins; a thread event index ordering events of a process thread; and event type information for ordering process threads.

The process time stamp monatonicity is provided by the thread event index values always increasing. Uniqueness of a process time stamp is provided by the process name and process thread identifier. Process thread identifiers are unique within the scope of a process name and the process name must be globally unique.

The event type information of the process time stamp closely follows node types of scenario event graph as set out below.

External event (Ex): is a marker for the external, initiation of a process.

Process thread begin event (Be): identifies the start of a process thread.

Process activity event (Ac): records an identifier for an action taken or the executed program statement.

Process thread fork event (Fk): connects a child process thread with its parent process thread.

Process thread half-join event (HJo): signals the end of the current process thread but not the service period of the object Process thread end event (En): indicates an end of the process thread and the object's service period.

The process thread begin event, process thread fork event, and the process thread half-join each are recorded with information with the event type to order process threads.

A fork event results in and is the cause of two subsequent events; one is placed in the same process thread and the other is taken as the beginning of a new child process thread. To identify the child process thread the fork event results in recording a new process thread identifier.

A half-join event differs from a scenario event graph language and-join node. In the scenario event graph language, the and-join node is a target of and preceded by two process threads. In angio tracing, half-join events are the cause of and precede a new process thread that results from the joining of two process threads. The joining process threads end with half-join events.

The event notation that is used combines the object time stamp and the process time stamp as follows: An event e has the time stamp values $$e = \left[\frac{ProcessEventGraph}{ObjectEventGraph}\right] = \left[\frac{j, k, m, l}{i, c, v}\right], \text{ where}$$

j is the process name for each process event graph,
k is the process thread identifier,
m is the thread event index,
l={Ex, Be, Ac, Fk, HJo, En} is the event type information including information specific to each event type,
i is the object identifier for each object event graph,
c is an object service period index, and
v is an object event index.

A process thread is identified with the process scenario name and the process thread identifier, such as |L,k|. If an object-oriented system is being monitored then the object identifier should include class name and instance number of an executing object. Some fields require a particular initialisation value. These values are specified as $v_0$ for the object event index, $c_0$ for the object period index and $m_0$ for the thread event index; these initial values are commonly initialised to 0 or to 1.

Information recorded with each event is used by the following event predicates:

fork(e, k) True if event e is a fork event that forked the process thread |j,k|, otherwise it is false. This is deduced as follows: (1) the parent event e is a fork event type, (2) event e recorded the child process thread's identifier, and (3) the child begin event recorded the process execution time stamp of its parent fork event. To test for a fork event, the process thread field takes on an arbitrary value—fork(e,-).

hJoin(E, |j,k|) If process thread |j,k| is caused by one or more half-join events, then the half-join events are assigned to set E and the predicate is true; otherwise it is false. This is deduced as follows: (1) half-join events are determined based on event types, (2) half-join events record resulting process thread's identifier, and (3) the begin event of the resulting process thread records the process time stamp of its parent half-join event(s).

isHJoin(e) True if event e is a half-join event; otherwise, it is false.

external(e) True if event e is an external event; otherwise, it is false.

begin(e) True if event e is a begin event, otherwise it is false.

end(e) True if event e is an end event, otherwise it is false.

activity(e, V) True if event e is an activity event that also recorded the process level information V, otherwise it is false. To test for an activity event, the process thread field takes on an arbitrary value such as activity(e,-)

last(i, c, e) True if event e is the last event recorded in period c of object i, otherwise it is false. This is determined by traversing the object event graph of object i in period c until the period index changes or there are no further events recorded for the object.

exist(e) True if event e is an event within the trace, otherwise it is false.

These predicates serve as conditions for the event ordering relations of angio tracing. An angio trace has six event ordering relations that use the time stamp information. These relations identify a given event's succeeding or preceding event in the object event graph or the process event graph. Each relation is reflexive, antisymmetric, and transitive. The ordering relations are $$\Omega \in \{>^T, <^T, >^{At}, >^{Ao}, <^{At}, <^{Ao}\},$$

where
$>^T$ orders the succeeding events in an object event graph,
$<^T$ orders the preceding events in an object event graph,
$>^{At}$ orders succeeding process event graph events in the same process thread,
$>^{Ao}$ orders succeeding process event graph events that are not in the same process thread such as a fork event and its child begin event and a half-join event and its child begin event,
$<^{At}$ orders preceding process event graph events that are in the same process thread, and
$<^{Ao}$ orders preceding process event graph events that are not in the same process thread.

An angio trace event description of an application's execution is transformed into a scenario event graph model for further analysis. This transformation consists of converting events to nodes, adding edges between nodes, and replacing half-join and external event types with simplified event types. The conversion of an event to a node is a one-to-one mapping. There are four operators that are used to add a labelled edge between two adjacent nodes.

nextObject($e_1$, $e_2$) adds a next object edge from the source node $e_1$ to the target node $e_2$;

nextPeriod($e_1$, $e_2$) adds a next period edge from the source node $e_1$ to the target node $e_2$;

nextAppTh($e_1$, $e_2$) adds a next process edge from the source node $e_1$ to the target node e2; and, andFork ($e_1$, $e_2$) adds an and-fork edge from the source node $e_1$ to the target node $e_2$.

Table 3 shows identifying operators that are invoked to add edges that are identified by the partial order relations, the node type, and some additional time stamp information.

Once edges are added to nodes, graph modifications as shown in Table 4 are applied to remove angio half-join and angio external event types, as well as to provide some simplifications of a resulting model.

The angio trace representation of the four possible styles of synchronisations that occur in scenario event graph are shown in Table 4. These illustrate how the half-join events are components of a scenario event graph and-join node.

It is common in practice for a task to interleave the processing of several service requests, maintaining state information for each outstanding request. This is typically implemented as a responding task polling several message queues and servicing the first message it finds. Angio tracing can accommodate this service period interleaving without violating proper time's assumption that a task's service period should not be interleaved. This is done using the two instrumentation operators suspend and resume. They are defined as:

suspend($ts_i$, $ts_t$) Copies task i's time stamp value $ts_i$ into the temporary time stamp storage location $ts_t$. Then task i's time stamp value is updated by clearing its operation time stamp, incrementing its task period index, and resetting its task period index value to $c_0$.

resume($ts_t$, $ts_i$) Copies the contents of the temporary time stamp storage location $ts_t$ into task i's time stamp value $ts_i$.

In each case an activity event is recorded with its application information set to either "suspend" or "resume", so that post-processing of the trace can determine if service periods are being interleaved.

The transformation from an angio trace to a scenario event graph model is known as a valid transformation because the partial order of the scenario is the same in both cases and the event ordering does not change; the meaning is preserved because there is a correspondence from the node connection specifications to the scenario event graph node connection strategies; and each node connection specification is unique so there is no conflict and corresponding non-determinism during the transformation process.

Scenario Graph Language Verification of Properties

The scenario graph language presented and defined herein is known to be complete and sound. This is important for several reasons. First, it ensures that all possible executions will be able to be interpreted for analysis with known semantics. Second, all necessary information will be captured in an unambiguous, non-contradictory fashion: no information is missing. Third, it ensures that only the necessary information is recorded so there is no redundancy in the data or extra overhead for data capture. Lastly, it facilitates automated analysis techniques because of the previous reasons. This permits its use in a wide variety of situations. Such a complete and sound graph language statement set is preferred.

The scenario graph language's node connections of Table 1 are complete and sound. They capture the valid ways to connect nodes and maintain causal relationships of a distributed application. A proof of the correctness is but described in both of the following articles which are herein incorporated by reference:

C. E. Hrischuk. Trace-based Load Characterization for the Automated Development of Software Performance Models. Ph.D. thesis, Carleton University, Ottawa, Canada, 1998.

C. Hrischuk, C. M. Woodside. "Logical clock requirements for reverse engineering scenarios from a distributed system." Accepted for publication in IEEE Trans. on Software Engineering.

Example Scenario Event Graphs

Example sub-graphs are now provided for an RPC, asynchronous, synchronisation, and forwarding interactions.

Figure 9:
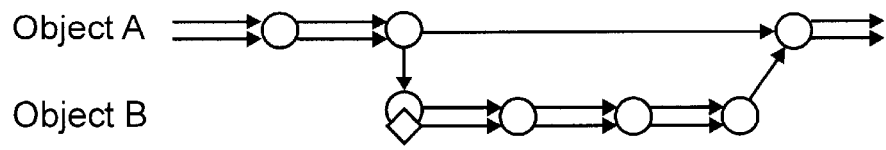
FIG. 9 is a diagram of a portion of a SEG of an RPC.

A SEG of an RPC is shown in FIG. 9. In an RPC interaction, the responding object is also the replier object. The process event graph resembles a procedure call graph if the object's were procedures.

Figure 10:
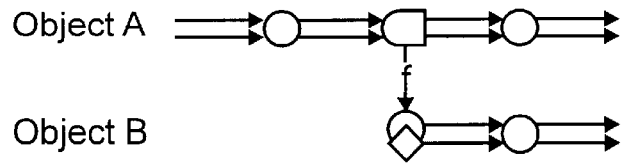
FIG. 10 is a diagram of a portion of a SEG of an asynchronous interaction.

A SEG of an asynchronous interaction is shown in FIG. 10.

Figure 11:
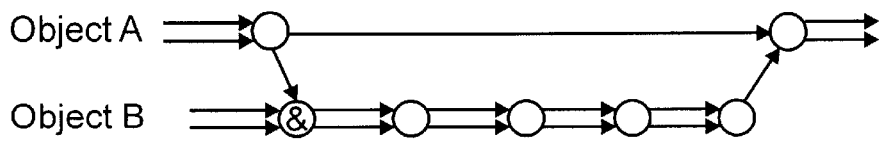
FIG. 11 is a diagram of a portion of a SEG of a case where a message is sent using a blocking communication protocol that results in a synchronisation.
Figure 12:
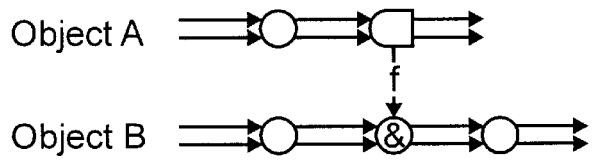
FIG. 12 is a diagram of a portion of a SEG of an initiating object using an asynchronous communication protocol that results in a synchronisation.
Figure 13:
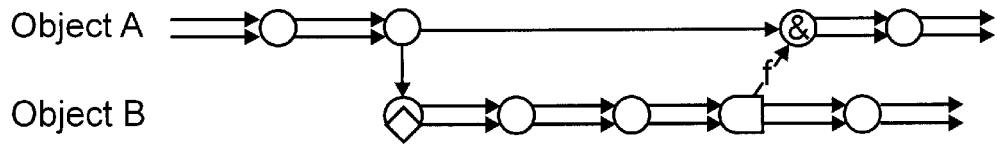
FIG. 13 is a diagram of a portion of a SEG where a blocked initiating object receives its reply to a service request that used an RPC communication protocol and it is considered to be a synchronisation.
Figure 14:
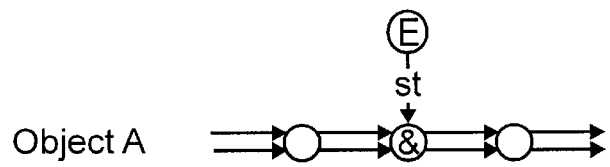
FIG. 14 is a diagram of a portion of a SEG involving acceptance of an external event that results in a synchronisation.

A synchronisation interaction occurs when the synchronising object has started a service period and it must accept another message to continue execution. There are four possible ways a synchronisation occurs. The first case is where the message was sent using a blocking communication protocol (shown in FIG. 11). The second case is where the initiating object used an asynchronous communication protocol (shown in FIG. 12). The third case occurs where a blocked initiating object receives its reply to a service request that used an RPC communication protocol (shown in FIG. 13). The procedure call graph analogy breaks down in this case because there are two concurrent threads of execution, since the responding object continues execution after sending the reply. This third case is characterised as a new process thread being forked for the reply. The last synchronisation case involves an external event being accepted (shown in FIG. 14).

Figure 15:
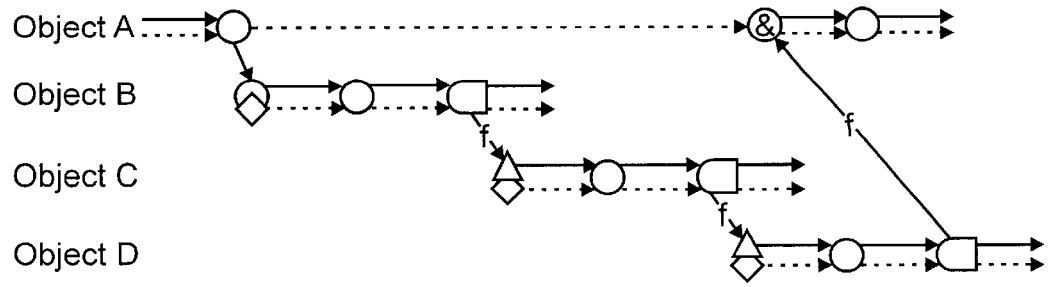
FIG. 15 is a diagram of a portion of a SEG of an example where: the initiating object (Object A) sends an RPC request and blocks, the first responding object (Object B) processes the request, and forwards it to another responding object (Object C), Object C processes the request further and forwards it to Object D which replies to the initiating object; and, FIG. 16 is a graph rewriting operation for simplifying a scenario event graph model.

A forwarding interaction involves an initiating object, a responding object that receives the initiating object's request, other responding objects that forward the request in an object pipeline, and a replier object. An example is shown in FIG. 15, where: the initiating object (Object A) sends an RPC request and blocks, the first responding object (Object B) processes the request, and forwards it to another responding object (Object C), Object C processes the request further and forwards it to Object D which replies to the initiating object.

Model Transformation Using Graph Rewrite Rules

A graph rewrite operation occurs by finding a sub-graph, identifying adjacent nodes and edges to the selected sub-graph, and then replacing the identified sub-graph with another, ensuring that the adjacent nodes and edges are undisturbed by the embedding of the new graph. In Table 4, graph rewriting rules are shown. In Table 4, the adjacent nodes and edges are numbered the same in the identification and replacement sub-graphs to ensure the embedding operation does not alter the adjacent nodes.

Figure 16:
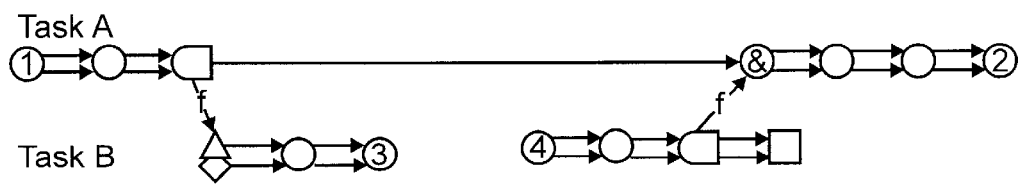
Figure 16:
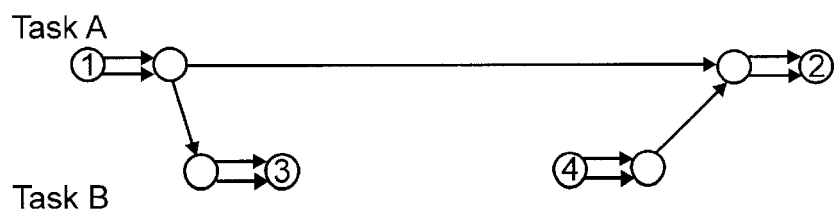

A graph rewrite rule preserves those nodes and their modified attribute values and adjacent edges. Graph rewriting operations are used to simplify a scenario event graph model during analysis as well as to establish graph properties. FIG. 16 provides two examples of this. In the first example, if the sub-graph to replace is found then it is proven that the sub-graph has that property. In the second case, the graph is rewritten and simplified, ready for another set of graph rewriting rules to prove a property or simplify the model.

A scenario event graph model is analysed or translated into a domain specific model. An analysis is done by first describing the properties to be assessed as a sub-graph template, which is then compared with the host scenario event graph model using an algorithm supplied by an analyst. A sub-graph template has variables and values. Translation of a scenario event graph model from one domain to another begins similar to analysis, except that a second sub-graph is supplied replacing each occurrence of a first sub-graph in the host scenario event graph model.

An example of this approach is shown in FIG. 16, which is a graph rewriting operation for simplifying a scenario event graph model. In this example, an RPC interaction occurs using asynchronous messages. By removing unnecessary nodes and replacing arcs, this is simplified. The input sub-graph template uses the numbered nodes to establish glue points to embed the output sub-graph template. The algorithmic graph grammar approach is ideal for this purpose and it is supported by a graph rewriting specification language and tool set called PROGRES.

Angio Trace Instrumentation and Time Stamps

The instrumentation for a method of the invention for use with an unreliable monitor is shown in Table 5 (Instrumentation Specification for an Unreliable Monitor). And for a reliable monitor is shown in Table 6 (An Optimized Instrumentation Specification for a Reliable Monitor).

A principle that governs implementation of angio tracing for a reliable monitor are to minimise the data recorded. There are several approaches that are used for an optimised implementation. First, only one event is recorded per instrumentation item, which requires that event type information be combined together. The event identifier syntax of Table 5 is still used but merged events will have combined subscripts. For example, two events $e_2$ and $e_3$ are described as the merged event $e_{2,3}$. Secondly, only the time stamp fields that change between events are recorded. Thirdly, only one ordering direction is recorded because the reverse ordering can be deduced by post-processing.

For an implementation description with a reliable monitor, the monitor has several characteristics. First, each object's events are stored serially, in-order. Optionally, different objects may store their events to the same buffer, so that events from different objects are stored in an interleaved fashion. Secondly, the monitor is able to detect missing events or guarantee that no events went missed during recording. Clocks local to each processing node need not be synchronised.

An object time stamp consists of an object identifier, an object period index, and an object event index. There are several optimisations for these time stamp fields. The object identifier is recorded with each event because the monitoring system is recording values for several objects simultaneously and interleaving the events. The object identifier is used to separate the events during post-processing.

The object periods are sequentially ordered because object events are serially recorded. The object period values need not be recorded with each event, but they are recorded when an object period ends. In this fashion, a change in an object period value means that a new object period has started and the object index of the succeeding event is reset to one. The object index values are not necessarily recorded because all object events are recorded sequentially; object index values are determinable from this ordering.

A process time stamp consists of a process name, a process thread identifier, a thread event index, and event type information. Optionally, each of these values is optimised as follows. Process name is recorded by external events as long as the process thread identifiers are globally unique, because the process name does not change throughout a process. Process thread identifier is recorded when a message is received since that is the only time it changes. Thread event index is changed after sending or receiving a message, so that an order of events in different objects is determinable.

The angio trace is unique because it has two timestamps used to establish an event ordering. One of those time stamps is dedicated to providing a scenario time stamp to order the events in the scenario.

An angio trace event is recorded by instrumentation embedded within an application that interfaces to the program monitor. A minimal set of instrumentation primitive operations must be supported by the program monitor and they are described here.

Process time stamp information is added to a message before it is sent to implement the ordering relations $\{>^{AO}, <^{AO}\}$. A message carries the process time stamp $S_1$ of the sending object's event that is the cause of the receive event. The process time stamp $S_2$ will replace the current process time stamp value of the receiving object. The sending object is responsible for generating $S_2$.

The monitor provides four operators. The first two are used to manipulate the time stamp values of a message. They are:

end(e, $S_1$, $S_2$) appends the process time stamps $S_1$ and $S_2$ to the message that is associated with the send event e;

rcv(e, $S_1$, $S_2$) retrieves the process time stamps $S_1$ and $S_2$ that were sent with the message received by event e;

record(e) atomically records and stores the event e; and unique(x) assigns a globally unique value to variable x.

The instrumentation is listed in Table 5 as well as Table 6. The instrumentation is defined by the last three columns. The instrumentation defines the time stamp information that each event must record and not how the instrumentation is to be coded or executed. Each row in the table should be interpreted as follows: "if the precondition values of object i1 are met, then execute the instrumentation primitives to record the identified events." The instrumentation for the suspension and resumption of an process thread is presented as (P) and (Q). The conventions that are used to describe the instrumentation follow.

The documentation columns of the table are the columns "Event Connection Interpretation" and "Instrumentation Comments". The "Event Connection Interpretation" column describes the purpose of the specification. The "Instrumentation Comments" column details the finer points of each event connection specification, identifying the purpose for recording each event.

The "Recorded Event Observations" is the most important column because it illustrates the recorded events and their ordering, using the conventions of the scenario event graph, the time stamp field values, and the ▭ icon for the half-join event. The illustrations show the recorded events with the angio trace time stamp information overlaid against the scenario event graph edges and nodes (where applicable). For the sake of simplicity there are two exceptions. First, the icon ✹ is added to represent any type of event provided it has the specified time stamp field values. Secondly, the domain data recorded with the activity event information is not shown because it is domain dependent.

Each illustration identifies the recorded events, as well as their preceding and succeeding event. Events in dashed boxes ⌐⌐⌐ are the events recorded by the instrumentation and, if there is more than one, they are recorded together atomically. The time stamp field values of the recorded events are the actual values that are recorded.

In all the illustrations, event e1 precedes the event(s) to be recorded by the instrumentation. The events which may succeed the recorded events are also shown. In some cases, boundary conditions exist. The illustrations will show additional events to describe the boundary condition, but these events will not be recorded in all cases. For example the source or target node of a object's next period edge may not exist.

The table refers to recording events for the object i1 and its instrumentation state vector may be used to determine which events to record. The "Precondition State of Object i1" column lists the predicates and conditions which must all be true for the instrumentation primitives to be executed. This state information is the object's instrumented state just prior to recording the events; it is not the state of the object when event e1 was recorded.

The executed instrumentation primitives are described in a column of the same name. The instrumentation primitives also identify object $i_1$'s instrumentation state vector values after executing the primitives.

The time stamps notation is as follow. A field value may be a symbolic, subscripted variable. Variables in the same event connection specification with the same subscripts have the same value. A time stamp field value with a "-" can take on any value. A field with the place holder value "-" can take on the empty value. All time stamp values are natural numbers, beginning at one.

Time Stamp Optimizations

Optimisations for each event type are as follows:

External event always has an index value of one so the index values need not be stored.

Begin event always has an index value of one as well.

Activity event is a default event type, therefore, an activity event type label is not recorded.

The information recorded for a Half-join event is reduced if the object time stamp information is used.

Fork event is not recorded because the corresponding begin event of the child process thread will provide ordering information.

End event is not recorded since it occurs predictably and its occurrence is determinable through post-processing.

According to one particular embodiment although the event connection specifications define the events and their time stamp values to be recorded, some implementation considerations must be addressed. To minimise the burden of instrumentation from the analyst, it is intended that the angio trace instrumentation is embedded in system activities for that particular environment. Then the analyst's instrumentation effort is limited to identifying external events and object periods. There are also standardisation concerns for use in a heterogeneous environment.

To amortise the instrumentation effort, it is expected that the instrumentation once designed remains embedded in message passing system functions of a distributed system programming language, system libraries, interface definition language compilers, and operating system kernel calls.

The analyst adds process specific instrumentation to identify where the execution of each distributed process begins and ends. Optionally, this instrumentation is added manually. Alternatively, the instrumentation for the end of a process is reduced by assuming that a process implicitly ends when another process begins. Software interrupts which signify an external event are easily instrumented as an external event and generate a unique process name automatically to start an angio trace. Also, the generation of angio traces may be transparently incorporated into the design testing effort with little additional cost, as well as providing additional information for debugging.

Object specific instrumentation is also necessary to identify beginning and ending of object periods. There are three independent approaches to reduce object period instrumentation; since object endings are likely more frequent than process endings, optimisation of this instrumentation is advantageous. When optimised, the start of an object period is deduced automatically for some system activities such as an RPC message acceptance or object creation. This is also true for the ending of an object period.

Another optimisation approach is to identify where synchronisation between process threads occurs. A service period serves as a boundary between different angio traces and it identifies synchronisation between process threads. However, angio trace separation is determinable from the process name values in the process time stamp. So, if the synchronisation points are instrumented then the service periods are determinable. For example, synchronisation is automatically identified by nested accept statements in ADA, nested interleaved RPC interactions, or synchronisation barriers in parallel programs.

Yet another optimisation approach is to introduce constraints on a process and use heuristics to deduce the start and end of an object period. If a process is constrained to being initiated by a single external event then the history of the process is used to infer the start of an object period, the end of an object period, and where a synchronisation occurs. When a single test-driver is used to initiate a process then this is a feasible approach.

The selection of which approach to adopt should be assessed for each application; however, it should be noted that the object period information is important design documentation, which is generally not captured.

An implementation concern to be addressed is standardisation of the format for use in a heterogeneous environment, including a trace format specification and the primitive ordinal types that are used by the specification.

MMAP Process Application

The method as described herein is also applicable to verifying application functionality. When an application is specified in a graph language such as use cases or message sequence charts, the graph language statements provided by the method according to the invention are translatable into said scenario graph language. A comparison between the specification scenario graph language description and the execution scenario graph language description results in design specification verification and improves overall design verification.

Also, since the method provides as an output from a scenario graph language description of process and object execution, transformation of the output to provide different views of system execution is possible. Though, the graph language described herein is complete and sound, optionally the transformations eliminate these properties in order to provide data in a manner that is more useful to an operator, designer, or a corporate executive. Many such transforms are applicable to each graph language output from such a system according to the invention.

There are other uses for scenario event graph aside from scenario causally or precedence ordering of events. It is applicable to automatically generating software performance models from traces of execution. Generic event templates are used to identify interactions and object behaviour. The interactions and object behaviour are mapped onto a performance model. Race detection and system visualisation make use of the interaction information. In this fashion, system optimisation and resource allocation are improved. Also, the process ordering relation provides a more selective view of potential causes of an event, which is a useful starting point for debugging.

In accordance with the invention a physical process is modelled. Examples of physical processes for modelling include manufacturing, purchasing, workflow, chemical processes, etc. By tracing events occurring through a scenario in a predetermined fashion, flow graphs relating to objects and processes within the scenario are determined. These graphs are then used to either automate certain objects which are commonly repeated and therefore in need of optimisation, which form bottlenecks, or which are performed in inefficient manners due to flow related issues. In workflow modelling, a plurality of people and systems record events during normal work. These events are then constructed into scenario graph language models which are transformed into different domains for different purposes. An evaluation of overtime efficiency is one such application. Elimination of inefficient but required activities, identification of resource shortages, automation of objects within processes, reduction of cost, and other optimisations are determined based on domain specific output.

Similarly in manufacturing, common sources of delay are identified and analysed to determine a cost for delays and a cost of implementing preventative action to eliminate delay. A simple business decision follows to determine whether or not to implement a delay preventing process. Essentially, gathering of event related information and automatically transforming same into process flow related information is beneficial in many fields.

Similar to the concept of "proper time" in relativity, a frame of reference may be any object, or, in this embodiment a response thread. Selection of a frame of reference does not affect validity of the results obtained. There is a duality between an object and a process thread. An observer that chooses an object as a frame of reference sees a succession of process threads, whereas, if the process thread is chosen as a reference, the observer sees a succession of objects.

Angio Trace Application

Alternatively, angio traces as described herein have several applications beyond model construction. An angio trace is so named because it is similar to medical applications, angiograms, where a dye is injected into a patient and its movement through the body is monitored. Similarly, when using an angio trace, monitoring permits analysis of flow of communications through an application. The term angio dye is used herein to describe an identifier forming part of a time stamp that allows for analysis of application execution and communication flow during execution, abstract execution, simulation, emulation, etc.

The use of an angio dye as used in an angio tracing system described herein, allows for tracking information flow in a process during execution. As such, angio dyes are applicable to system self-monitoring. An example of a self-monitoring application includes, monitoring of network objects for crashes or resource overload. For example, when a process is divided among several processors in distributed systems, each system is required to transmit angio dye related information at intervals in the form of predetermined intervals. The information is used to monitor progress on provided objects or applications and to establish that each distributed processor is in operation. Failure to receive angio dye related information or failure of a processor to progress fast enough, results in corrective action such as providing the same object to another processor for execution. Optionally, the first object execution request is not withdrawn and results from a first processor to complete the object are used.

In another example application, angio dye related information is used to prevent record-playback of an encryption key. Since a times tamp as used in angio tracing is substantially unique, packaging an encryption key with such a time stamp, prevents its use at a later time. This allows for a traced system employing angio tracing to distinguish between current communicated information and previous or stale communicated information. Of course many other applications of angio dye related information, scenario graph language models, and tracing may be envisioned without departing from the spirit or scope of the invention.

In an alternative embodiment, angio tracing and scenario event graph are used to model a hardware process. For example, in design and implementation of a large hardware device, simulation is often employed. During simulation, an angio trace and a scenario event graph model of the simulation or of the simulation as well as a software simulation is constructed and analysed. This permits design verification, design optimisation, and performance evaluation. Similarly when a design is intended for mass production or is implemented in a programmable device, a hardware based angio trace for analysis in forming a scenario event graph model is employed. As much integrated circuit design involves library circuit blocks, such an implementation of a monitor for angio tracing is not unrealistic and provides numerous advantages as disclosed herein.

It is known to perform pattern analysis for design of software applications, workflow engineering, and process design. According to an embodiment of the invention, a SEG is analysed to determine patterns therein. These patterns are in the form of at least one of predetermined patterns and patterns identified through analysis of the SEG. Identification of patterns within the SEG provides valuable information for use in system optimisation, reverse engineering, design review, implementation analysis, and so forth.

In order to identify patterns within a SEG a generic mathematical approach to pattern recognition is applicable. Patterns within the SEG are identified as being identical or substantially similar in some aspect. For example, flow of a graph segment when identical is identified. Non flow related events within the graph segments are then compared in order to determine whether a correlation exists. When optimisation is possible on one of the identified graph segments, the other graph segments are reviewed to determine an applicability of a same or similar optimisation.

Alternatively, when substantially similar or identical graph segments are identified, design analysis to optimise a process in the form of a computer software program for memory utilisation, speed, reliability, or other known goals of design analysis and optimisation is performed. The design analysis, because it is of an executing software program, is an accurate and pertinent analysis of the process as implemented.

Numerous other embodiments may be envisioned without departing from the spirit or scope of the invention.

TABLE 1

| Node Connection Interpretation | Allowed Protocol Role(s) | Node Connection Figure |
|---|---|---|
| (A) External system request. | No object |  |
| (B) End of the object period and process thread. | Any role | 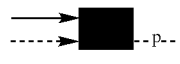 |
| (C) A process action event. | Any role | 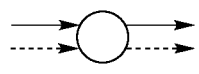 |
| (D) Initiation of an RPC message exchange. | Initiator or Forwarder | 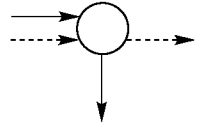 |

TABLE 1-continued

| Node Connection Interpretation | Allowed Protocol Role(s) | Node Connection Figure |
|---|---|---|
| (E) Acceptance of a message sent using an RPC message exchange. | Responder or Forwarder or Replier | 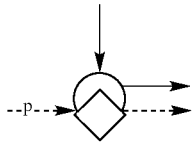 |
| (F) Sending the reply to an RPC message exchange. The reponding object's service period ends. | Replier | 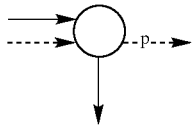 |
| (G) A blocked initiating object in an RPC message exchange receives the reply. The replying object ended its service period after it sent the reply. An and-join node is not used because there is only one process thread. | Initiator | 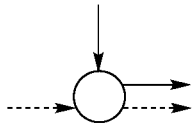 |
| (H) There are three possible interpretations of this node connection axiom:<br>(1) An initiating object initiates an asynchronous message exchange.<br>(2) A replier object sends the reply to an RPC message exchange and it does not end it service period but continues executing.<br>(3) A forwarding object forwards the message to another reponding object. | (1) Initiator or<br>(2) Replier or<br>(3) Forwarder | 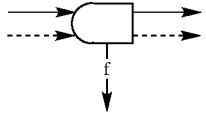 |
| (I) A blocked object that is not executing in a service period now accepts a message that was sent asynchronously. | Responder or Forwarder or Replier | 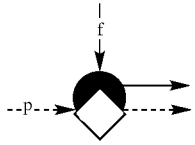 |
| (J) A blocked object that is executing in a service period completes a syn chronization by accepting a message. The message was sent using an RPC message exchange. | Responder or Forwarder or Replier | 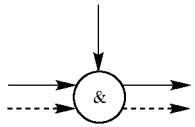 |
| (K) A blocked initiating object in an RPC message exchange receives the reply to its message. The replying object did not end its service period after it sent the reply. | Initiator | 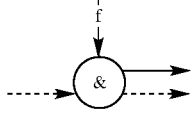 |
| (L) A blocked object that is executing in a service period completes a syn chronization by accepting a message. The message was sent as an asyn chronous message exchange. | Responder or Forwarder or Replier | 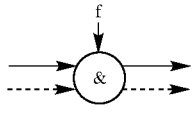 |
| (M) A blocked object that is not executing in a service period now begins executing because of an external request. | Initiator | 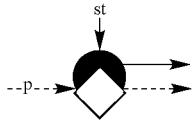 |
| (N) A blocked object that is executing in a service period completes a synchronization by accepting an external request. | Responder or Forwarder or Replier | 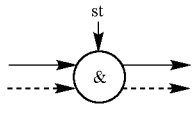 |

TABLE 1-continued

| Node Connection Interpretation | Allowed Protocol Role(s) | Node Connection Figure |
|---|---|---|
| (O) An RPC exception condition which unblocks the initiating object in an RPC message exchange. | Initiator | 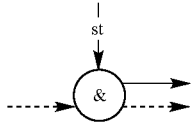 |

TABLE 2

| Node Connection Axiom | Node Type | Previous Node Connection Axiom in the Same Object Event Graph (InProc and InObject) | Previous Node Connection Axiom in a Different Object Event Graph (InProcExt) | Successor Node Connection Axiom in the Same Object Event Graph (OutProc and OutObject) | Successor Node Connection Axiom in a Different Object Event Graph (OutProcExt) |
|---|---|---|---|---|---|
| A | External | n/a | n/a | n/a | M, N, O |
| B | Thread end | C, E, G, H, I, J, K, L, M, N, O | n/a | E, I, M | n/a |
| C | Action | C, E, G, H, I, J, K, L, M, N, O | n/a | B, C, D, F, H, J, L, N | n/a |
| D | Action | C, E, G, H, I, J, K, L, M, N, O | n/a | G, K, O | E, J |
| E | Action | B, F | D | B, C, D, F, H, J, L, N | n/a |
| F | Action | C, E, G, H, I, J, K, L, M, N, O | n/a | E, I, M | G |
| G | Action | D | F | B, C, D, F, H, J, L, N | n/a |
| H | Fork | C, E, G, H, I, J, K, L, M, N, O | n/a | B, C, D, F, H, J, L, N | I, K, L |
| I | Thread begin | B, F | H | B, C, D, F, H, J, L, N | n/a |
| J | And-join | C, E, G, H, I, J, K, L, M, N, O | D | B, C, D, F, H, J, L, N | n/a |
| K | And-join | D | H | B, C, D, F, H, J, L, N | n/a |
| L | And-join | C, E, G, H, I, J, K, L, M, N, O | H | B, C, D, F, H, J, L, N | n/a |
| M | Thread begin | B, F | A | B, C, D, F, H, J, L, N | n/a |
| N | And-join | C, E, G, H, I, J, K, L, M, N, O | A | B, C, D, F, H, J, L, N | n/a |
| O | And-join | D | A | B, C, D, F, H, J, L, N | n/a |

TABLE 3

Edge Type Assignment from Nodes $e_1$ to $e_2$

| Event type of $e_1$ where $e_1 = \left\| \begin{array}{c} j_1, k_1, m_1 \\ i_1, c_1, v_1 \end{array} \right\|$ and $e_2 = \left\| \begin{array}{c} j_2, k_2, m_2 \\ i_2, c_2, v_2 \end{array} \right\|$ | Successor Event $e_2$ in the Task Event Graph $>^T(e_1, e_2)$ | Successor Event $e_2$ in the Same Operation Thread $>^{At}(e_1, e_2)$ | Successor Event $e_2$ that is not in the Same Operation Thread $>^{Ao}(e_1, e_2)$ |
|---|---|---|---|
| Activity event activity($e_1$, –) | $(c_1 = c_2) \rightarrow$ nextTask($e_1, e_2$) ∨ $(c_1 \neq c_2) \rightarrow$ nextPeriod($e_1, e_2$) | nextOpTh($e_1, e_2$) | N/A |
| External event external($e_1$, –) | nextTask($e_1, e_2$) | nextOpTh($e_1, e_2$) | N/A |
| Begin event begin($e_1$) | nextTask($e_1, e_2$) | nextOpTh($e_1, e_2$) | N/A |
| Fork event fork($e_1$, –) | nextTask($e_1, e_2$) | nextOpTh($e_1, e_2$) | andFork($e_1, e_2$) |
| Half-join event isHJoin($e_1$) | nextTask($e_1, e_2$) | N/A | N/A |

TABLE 3-continued

Edge Type Assignment from Nodes $e_1$ to $e_2$

| Event type of $e_1$ where $e_1 = \begin{vmatrix} j_1, k_1, m_1 \\ i_1, c_1, v_1 \end{vmatrix}$ and $e_2 = \begin{vmatrix} j_2, k_2, m_2 \\ i_2, c_2, v_2 \end{vmatrix}$ | Successor Event $e_2$ in the Task Event Graph $>^T(e_1, e_2)$ | Successor Event $e_2$ in the Same Operation Thread $>^{At}(e_1, e_2)$ | Successor Event $e_2$ that is not in the Same Operation Thread $>^{Ao}(e_1, e_2)$ |
|---|---|---|---|
| End event end($e_1$) | $(c_1 = c_2) \rightarrow$ nextTask($e_1, e_2$) ∨ $(c_1 \neq c_2) \rightarrow$ nextPeriod($e_1, e_2$) | N/A | N/A |

TABLE 4

Graph Rewriting Rules To Make a SEG

| Description | Sub-graph to Replace (RHS) | Replacement Sub-graph to Embed (LHS) |
|---|---|---|
| Responder object synchronization from an RPC interation. | | |
| Responder object synchronization from an asynchronous interaction. | | |
| Initiating object synchronization from an RPC interaction. | | |
| Responder object synchronization from an external event. | | |
| RPC interruption | | |
| An external event is converted to the SEG external node, start operation edge, and begin operation thread node. | | |

TABLE 4-continued

Graph Rewriting Rules To Make a SEG

| Description | Sub-graph to Replace (RHS) | Replacement Sub-graph to Embed (LHS) |
|---|---|---|
| Same as above. | (graph) | (graph) |

TABLE 5

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (A) External system request. | See (M), (N), or (O) | | | |
| (B) End of the object period and process thread. | Event $e_3$ will not occur if the object $i_1$ is not involved in any further interactions. | $j = j_1$; $k = k_1$; $m = m_1 + 1$; $c = c_1$; $v = v_1 + 1$; | $e_1 = \left\| \begin{array}{c} j_1, k_1, m_1, - \\ i_1, c_1, v_1 \end{array} \right\|$, $e_2 = \left\| \begin{array}{c} j_1, k_1, m_1 + 1, En \\ i_1, c_1, v_1 + 1 \end{array} \right\|$, $e_3 = \left\| \begin{array}{c} -, -, -, - \\ i_1, c_1 + 1, 1 \end{array} \right\|$ | record($e_2$); $j \leftarrow \emptyset$; $m \leftarrow \emptyset$; $c \leftarrow c_1 + 1$; $v \leftarrow 1$; |
| (C) An activity event. | | $j = j_1$; $k = k_1$; $m = m_1 + 1$; $c = c_1$; $v = v_1 + 1$; | $e_1 = \left\| \begin{array}{c} j_1, k_1, m_1, - \\ i_1, c_1, v_1 \end{array} \right\|$, $e_2 = \left\| \begin{array}{c} j_1, k_1, m_1 + 1, Ac \\ i_1, c_1, v_1 + 1 \end{array} \right\|$, $e_3 = \left\| \begin{array}{c} j_1, k_1, m_1 + 2, - \\ i_1, c_1, v_1 + 2 \end{array} \right\|$ | record($e_2$); $m \leftarrow m_1 + 2$; $v \leftarrow v_1 + 2$; |
| (D) Initiation of an RPC interaction. | Event $e_2$ is the activity event for the sending of the request. | $j = j_1$; $k = k_1$; $m = m_1 - 1$; $c = c_1$; $v = v_1 + 1$; | $e_1 = \left\| \begin{array}{c} j_1, k_1, m_1, - \\ i_1, c_1, v_1 \end{array} \right\|$, $e_2 = \left\| \begin{array}{c} j_1, k_1, m_1 + 1, Ac \\ i_1, c_1, v_1 + 1 \end{array} \right\|$, $e_3 = \left\| \begin{array}{c} -, -, -, - \\ i_1, c_1, v_1 - 2 \end{array} \right\|$, $e_4 = \left\| \begin{array}{c} j_1, k_1, m_1 + 2, - \\ i_2, -, - \end{array} \right\|$ | send($e_2$, $S_1$, $S_2$) where $S_1 \leftarrow (j_1, k_1, m_1 - 1)$, $S_2 \leftarrow (j_1, k_1, m_1 + 2)$; record($e_2$); $j \leftarrow \emptyset$; $k \leftarrow \emptyset$; $m \leftarrow \emptyset$; $v \leftarrow v_1 - 2$; |
| (E) Acceptance of a service request sent as an RPC interaction. | Event $e_3$ is the activity event for the acceptance of the request. | rev($e_3$, $S_1$, $S_2$) where $S_1 = (j_1, k_1, m_1)$, $S_2 = (j_1, k_1, m_1 + 1)$; $j = \emptyset$; $k = \emptyset$; $m = \emptyset$; $c = c_1 - 1$; $v = 1$; | $e_1 = \left\| \begin{array}{c} j_1, k_1, m_1, Ac \\ i_2, -, - \end{array} \right\|$, $e_2 = \left\| \begin{array}{c} -, -, -, - \\ i_1, c_1, - \end{array} \right\|$, $e_3 = \left\| \begin{array}{c} j_1, k_1, m_1 + 1, Ac \\ i_1, c_1 + 1, 1 \end{array} \right\|$, $e_4 = \left\| \begin{array}{c} j_1, k_1, m_1 + 2, - \\ i_1, c_1 + 1, 2 \end{array} \right\|$ | record($e_3$); $j \leftarrow j_1$; $k \leftarrow k_1$; $m \leftarrow m_1 - 1$; $v \leftarrow 2$; |

TABLE 5-continued

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (F) Sending the reply to a service request sent as an RPC interaction. The responding object's service period ends. | Event $e_3$ records the activity event for the reply acceptance. Event $e_4$ will not occur if the object $i_2$ is not involved in any further interactions. | $j = j_1$; $k = k_1$; $m = m_1 + 1$; $c = c_1$; $v = v_1 + 1$; | 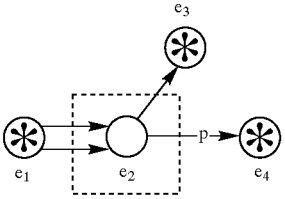 $e_1 = \left\| \frac{j_1, k_1, m_1, -}{i_1, c_1, v_1} \right\|$, $e_2 = \left\| \frac{j_1, k_1, m_1 + 1, Ac}{i_1, c_1, v_1 + 1} \right\|$, $e_3 = \left\| \frac{j_1, k_1, m_1 - 2, -}{i_2, -, -} \right\|$, $e_4 = \left\| \frac{-, -, -, -}{i_1, c_1 + 1, 1} \right\|$ | send($e_2$, $S_1$, $S_2$) where $S_1 \leftarrow (j_1, k_1, m_1 + 1)$, $S_2 \leftarrow (j_1, k_1, m_1 + 2)$, record($e_2$); $j \leftarrow \emptyset$; $k \leftarrow \emptyset$; $m \leftarrow \emptyset$; $c \leftarrow c_1 + 1$, $v \leftarrow 1$; |
| (G) A blocked initiating object in an RPC interaction receives the reply to its service request. The replying object ended its service period after it sent the reply. | Event $e_3$ records the activity event for the reply acceptance. | rev($e_3$, $S_1$, $S_2$) where $S_1 = (j_1, k_2, m_2)$, $S_2 = (j_1, k_2, m_2 - 1)$; $j = \emptyset$; $k = \emptyset$; $m = \emptyset$; $c = c_1$; $v = v_1 + 1$; | 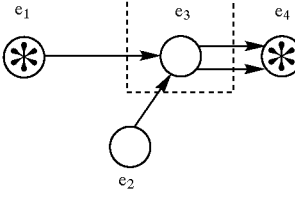 $e_1 = \left\| \frac{-, -, -, -}{i_1, c_1, v_1} \right\|$, $e_2 = \left\| \frac{j_1, k_2, m_2, -}{i_2, -, -} \right\|$, $e_3 = \left\| \frac{j_1, k_2, m_2 + 1, Ac}{i_1, c_1, v_1 + 1} \right\|$, $e_4 = \left\| \frac{j_1, k_1, m_2 + 2, -}{i_1, c_1 v_1 + 2} \right\|$ | record($e_3$); $j \leftarrow j_1$; $k \leftarrow k_2$; $m \leftarrow m_2 + 2$; $v \leftarrow v_1 + 2$; |
| (H) There are three interpretations: (1) An initiating object initiates an asynchronous interaction. (2) A responding object sends the reply to a service request sent as an RPC intraction and the responding object does not end it service period but continues executing after sending the reply. (3) A forwarding object forwards the service request to another responding object. | There are two events recorded. Event $e_2$ is the activity event that identifies the statement executed and event $e_3$ characterizes the forked process thread. | $j = j_1$; $k = k_1$; $m = m_1 + 1$; $c = c_1$; $v = v_1 + 1$; | 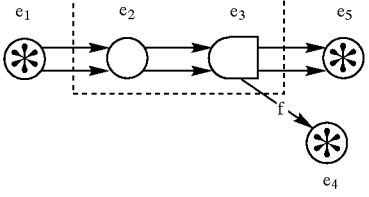 $e_1 = \left\| \frac{j_1, k_1, m_1, -}{i_1, c_1, v_1} \right\|$, $e_2 = \left\| \frac{j_1, k_1, m_1 + 1, Ac}{i_1, c_1, v_1 + 1} \right\|$, $e_3 = \left\| \frac{j_1, k_1, m_1 + 2, (Fo, (j_1, k_2))}{i_1, c_1, v_1 + 2} \right\|$, $e_4 = \left\| \frac{j_1, k_2, 1, (Be, (j_1, k_1, m_1 + 2))}{i_2, -, -} \right\|$, $e_5 = \left\| \frac{j_1, k_1, m_1 + 3, -}{i_1, c_1, v_1 + 3} \right\|$ where fork($e_3$, ($j_1, k_2$)) | unique($k_2$); send($e_3$, $S_1$, $S_2$) where $S_1 \leftarrow (j, k_1, m_1 + 2)$, $S_2 \leftarrow (j_1, k_2, 1)$; record($e_2$); record($e_3$); $m \leftarrow m_1 + 3$; $v \leftarrow v_1 - 3$; |

TABLE 5-continued

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (I) A blocked object that is not processing a previously accepted service request now accepts a service request that was sent asynchronously | There are two events recorded. Event $e_2$ is the activity event that is associated with the actual acceptance of the request and event $e_3$ is the beginning of the forked process thread. | $rev(e_3, S_1, S_2)$ where $S_1 = (j_1, k_1, m_1)$, $S_2 = (j_1, k_2, 1)$; $j = \emptyset$; $k = \emptyset$; $m = \emptyset$; $c = c_1 + 1$; $v = 1$; | 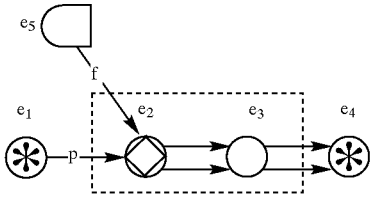 $e_1 = \left\|\dfrac{-,-,-,-}{i_1, c_1, -}\right\|$, $e_2 = \left\|\dfrac{j_1, k_2, 1, (Be, (j_1, k_1, m_1))}{i_1, c_1+1, 1}\right\|$, $e_3 = \left\|\dfrac{j_1, k_2, 2, Ac}{i_1, c_1+1, 2}\right\|$, $e_4 = \left\|\dfrac{j_1, k_2, 3, -}{i_1, c_1+1, 3}\right\|$, $e_5 = \left\|\dfrac{j_1, k_1, m_1, (Fo, (j_1, k_2))}{i_2, -, -}\right\|$ where $fork(e_5, (j_1, k_2))$ | $record(e_2)$; $record(e_3)$; $j \leftarrow j_1$; $k \leftarrow k_2$; $m \leftarrow 3$; $v \leftarrow 3$; |
| (J) A blocked object that is processing a previously accepted service request completes a synchronization by accepting a service request. The service request was sent as an RPC interaction. | There are four events that are recorded: $e_2, e_3, e_4,$ and $e_5$. The half-join event $e_2$ indicates that the process thread $|j_1, k_1|$ is ending but the object's service period is not over. The half-join event $e_3$ indicates that the process thread $|j_2, k_2|$ is ending but the service period is not over. Each of these half-join events indicates that the new process thread $|j_1, k_3|$ is the result of the two scenario threads joining. Event $e_4$ is the start of the resulting process thread $|j_1, k_3|$. Event $e_5$ is the activity event that records the statement used to accept the request. | $rev(e_2, S_1, S_2)$ where $S_1 = (j_2, k_2, m_2)$, $S_2 = (j_2, k_2, m_2 + 1)$; $j = j_1$; $k = k_1$; $m = m_1 + 1$; $c = c_1$; $v = v_1 + 1$; | 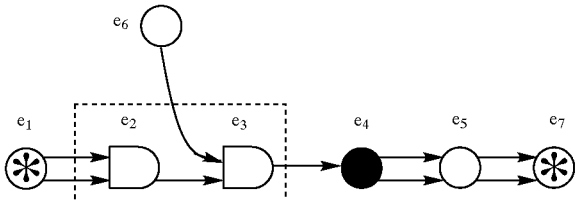 $e_1 = \left\|\dfrac{j_1, k_1, m_1, -}{i_1, c_1, v_1}\right\|$, $e_2 = \left\|\dfrac{j_1, k_1, m_1+1, (Hjo, (j_1, k_3))}{i_1, c_1, v_1+1}\right\|$, $e_3 = \left\|\dfrac{j_2, k_2, m_2+1, (Hjo, (j_1, k_3))}{i_1, c_1, v_1+2}\right\|$, $e_4 = \left\|\dfrac{j_1, k_3, 1, (Be, (j_2, k_2, m_2+1), (j_1, k_1, m_1+1))}{i_1, c_1, v_1-3}\right\|$, $e_5 = \left\|\dfrac{j_1, k_3, 2, Ac}{i_1, c_1, v_1+4}\right\|$, $e_6 = \left\|\dfrac{j_2, k_2, m_2, Ac}{i_2, -, -}\right\|$, $e_7 = \left\|\dfrac{j_1, k_3, 3, -}{i_1, c_1, v_1+5}\right\|$ where $hJoin(\{e_2, e_3\}, (j_1, k_3))$ | $unique(k_3)$; $record(e_2)$; $record(e_3)$; $record(e_4)$; $record(e_5)$; $k \leftarrow k_3$; $m \leftarrow 3$; $v \leftarrow v_1 + 5$; |

TABLE 5-continued

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (K) A blocked initiating object in an RPC interaction becomes unblocked by receiving the reply to its service request and the replying object did not end its service period after it sent the reply. The blocked initiating object may also become unblocked due to an RPC interruption. | There are four events that are recorded: $e_2$, $e_3$, $e_4$, and $e_5$. The begin event $e_2$ is needed to start the forked process thread $\lfloor j_2, k_3 \rfloor$. The half-join event $e_3$ indicates that the process thread $\lfloor j_2, k_3 \rfloor$ is ending but the service period is not over. It indicates that the resulting process thread $\lfloor j_1, k_4 \rfloor$ is the result of the synchronization. Event $e_4$ is the start of the new process thread $\lfloor j_1, k_4 \rfloor$. Event $e_5$ is the activity event that records the statement used to accept the request. Only one half-join event is needed because there is only one process thread that is ending, but this is still a sychronization because a message is accepted within an active service period. | rev($e_2$, $S_1$, $S_2$) where $S_1 = (j_2, k_2, m_2)$, $S_2 = (j_2, k_3, 1)$; $j = \emptyset$; $k = \emptyset$; $m = \emptyset$; $c = c_1$; $v = v_1 + 1$; | $e_1 = \left\lvert \dfrac{j_1, k_1, m_1, Ac}{i_1, c_1, v_1} \right\rvert$, $e_2 = \left\lvert \dfrac{j_2, k_3, 1, (Be, (j_2, k_2, m_2))}{i_1, c_1, v_1 + 1} \right\rvert$, $e_3 = \left\lvert \dfrac{j_2, k_3, 2, (HJo, (j_1, k_4))}{i_1, c_1, v_1 + 2} \right\rvert$, $e_4 = \left\lvert \dfrac{j_1, k_4, 1, (Be, (j_2, k_3, 2))}{i_1, c_1, v_1 + 3} \right\rvert$, $e_5 = \left\lvert \dfrac{j_1, k_4, 2, Ac}{i_1, c_1, v_1 + 4} \right\rvert$, $e_6 = \left\lvert \dfrac{j_2, k_2, m_2, (Fo, (j_2, k_3))}{i_2, -, -} \right\rvert$, $e_7 = \left\lvert \dfrac{j_1, k_4, 3, -}{i_1, c_1, v_1 + 5} \right\rvert$ where fork($e_3$, $\{j_1, k_4\}$) and hJoin($\{e_3\}$, $(j_1, k_4)$) | unique($k_4$); record($e_2$); record($e_3$); record($e_4$); record($e_5$); $j \leftarrow j_1$; $k \leftarrow k_4$; $m \leftarrow 3$; $v \leftarrow v_1 + 5$; |
| (L) A blocked object that is processing a previously accepted service request completes a synchronization by accepting a service request. The service request was sent as an asynchronous interaction | There are five events that are recorded: $e_2$, $e_3$, $e_4$, $e_5$ and $e_6$. The half-join event $e_2$ indicates that the process thread $\lfloor j_1, k_1 \rfloor$ is ending but the service period is not over. The begin event $e_3$ is needed to start the forked process thread $\lfloor j_2, k_3 \rfloor$. The half-join event $e_4$ indicates that the process thread $\lfloor j_2, k_3 \rfloor$ is ending but the service period is not over. Each of these half-join events indicates that the new process thread $\lfloor j_1, k_4 \rfloor$ is the result of the two scenario threads joining. Event $e_5$ is the start of the process thread $\lfloor j_1, k_4 \rfloor$. Event $e_6$ is the activity event that records the statement used to accept the request. | rev($e_2$, $S_1$, $S_2$) where $S_1 = (j_2, k_2, m_2)$. $S_2 = (j_2, k_3, 1)$; $j = j_1$; $k = k_1$; $m = m_1 + 1$; $c = c_1$; $v = v_1 + 1$; | $e_1 = \left\lvert \dfrac{j_1, k_1, m_1, -}{i_1, c_1, v_1} \right\rvert$, $e_2 = \left\lvert \dfrac{j_1, k_1, m_1 + 1, (HJo, (j_1, k_4))}{i_1, c_1, v_1 + 1} \right\rvert$, $e_3 = \left\lvert \dfrac{j_2, k_3, 1, (Be, (j_2, k_2, m_2))}{i_1, c_1, v_1 + 2} \right\rvert$, $e_4 = \left\lvert \dfrac{j_2, k_3, 2, (HJo, (j_1, k_4))}{i_1, c_1, v_1 + 3} \right\rvert$, $e_5 = \left\lvert \dfrac{j_1, k_4, 1, (Be, (j_2, k_3, 2), (j_1, k_1, m_1 + 1))}{i_1, c_1, v_1 + 4} \right\rvert$, $e_6 = \left\lvert \dfrac{j_1, k_4, 2, Ac}{i_1, c_1, v_1 + 5} \right\rvert$, $e_7 = \left\lvert \dfrac{j_2, k_2, m_2, (Fo, (j_2, k_3))}{i_2, -, -} \right\rvert$, $e_8 = \left\lvert \dfrac{j_1, k_4, 3, -}{i_1, c_1, v_1 + 6} \right\rvert$ where for k ($e_7$, $\{i_2, k_3\}$) and hJoin ($\{e_2, e_4\}$, $(j_1, k_4)$) | unique($k_4$); record($e_2$); record($e_3$); record($e_4$); record($e_5$); record($e_6$); $k \leftarrow k_4$; $m \leftarrow 3$; $v \leftarrow v_1 + 6$; |

TABLE 5-continued

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (M) A blocked object that is not processing a previously accepted service request now begins an process thread because of an external request. | Event $e_1$ will not occur if it is the object's first period, in which case $c_1$ is one. | $j = \emptyset$; $k = \emptyset$; $m = \emptyset$; $c = c_1 + 1$; $v = 1$; | $e_1 \quad e_2 \quad e_3$ <br><br> $e_1 = \left\| \begin{array}{c} -,-,-,- \\ i_1, c_1, - \end{array} \right\|$, $e_2 = \left\| \begin{array}{c} j_1, k_1, 1, \text{Ex} \\ i_1, c_1 + 1, 1 \end{array} \right\|$, $e_3 = \left\| \begin{array}{c} j_1, k_1, 2, - \\ i_1, c_1 + 1, 2 \end{array} \right\|$ | unique($j_1$); unique($k_1$); record($e_2$); $j \leftarrow j_1$; $k \leftarrow k_1$; $m \leftarrow 2$; $v \leftarrow 2$; |
| (N) A blocked object that is processing a previously accepted service request completes a synchronization by accepting an external request (e.g., a received message without time stamp information is an external event). | There are five events that are recorded: $e_2$, $e_3$, $e_4$, $e_5$ and $e_6$. The half-join event $e_2$ indicates that the process thread $\|j_1, k_1\|$ is ending but the service period is not over. The external event $e_3$ starts the new process thread $\|j_2, k_3\|$. The half-join event $e_4$ indicates that the process thread $\|j_2, k_3\|$ is ending but the service period is not over. Each of these half-join events indicates that the new process thread $\|j_1, k_4\|$ is the result of the two scenario threads joining. Event $e_5$ is the start of the process thread $\|j_1, k_4\|$. Event $e_6$ is the activity event that records the statement used to accept the request. | $j = j_1$; $k = k_1$; $m = m_1 + 1$; $c = c_1$; $v = v_1 + 1$; | $e_1 \quad e_2 \quad e_3 \quad e_4 \quad e_5 \quad e_6 \quad e_7$ <br><br> $e_1 = \left\| \begin{array}{c} j_1, k_1, m_1, - \\ i_1, c_1, v_1 \end{array} \right\|$, $e_2 = \left\| \begin{array}{c} j_1, k_1, m_1 + 1, (\text{HJo}, (j_1, k_4)) \\ i_1, c_1, v_1 + 1 \end{array} \right\|$, <br><br> $e_3 = \left\| \begin{array}{c} j_2, k_3, 1, \text{Ex} \\ i_1, c_1, v_1 + 2 \end{array} \right\|$, $e_4 = \left\| \begin{array}{c} j_2, k_3, 2, (\text{HJo}, (j_1, k_4)) \\ i_1, c_1, v_1 + 3 \end{array} \right\|$, <br><br> $e_5 = \left\| \begin{array}{c} j_1, k_4, 1, (\text{Be}, (j_2, k_3, 2), (j_1, k_1, m_1 + 1)) \\ i_1, c_1, v_1 + 4 \end{array} \right\|$, <br><br> $e_6 = \left\| \begin{array}{c} j_1, k_4, 2, \text{Ac} \\ i_1, c_1, v_1 + 5 \end{array} \right\|$, $e_7 = \left\| \begin{array}{c} j_1, k_4, 3, - \\ i_1, c_1, v_1 + 6 \end{array} \right\|$ <br><br> where jhJoin($\{e_2, e_4\}$, $(j_1, k_4)$) | unique($k_2$); unique($k_3$); unique($k_4$); record($e_2$); record($e_3$); record($e_4$); record($e_5$); record($e_6$); $k \leftarrow k_4$; $m \leftarrow 3$; $v \leftarrow v_1 + 6$; |

TABLE 5-continued

Instrumentation Specification for an Unreliable Monitor

| Event Connection Interpretation | Instrumentation Comments | Precondition State of Object $i_1$ | Recorded Event Observations | Instrumentation Sequences |
|---|---|---|---|---|
| (O) A blocked initiating object in an RPC interaction becomes unblocked due to an RPC interruption caused by an external event. | There are four events that are recorded: $e_2$, $e_3$, $e_4$, and $e_5$. The external event $e_2$ interrupts the RPC initiated by event $e_1$ and it starts the process thread $|j_2, k_2|$. The half-join event $e_3$ indicates that the process thread $|j_2, k_2|$ is ending but the service period is not over. It indicates that the resulting process thread $|j_1, k_3|$ is the result of the synchronization. Event $e_4$ is the start of the new process thread $|j_1, k_3|$. Event $e_5$ is the activity event that records the statement used to accept the request. Only one half-join event is needed because there is only one process thread that is ending. | $j = \emptyset$; $k = \emptyset$; $m = \emptyset$; $c = c_1$; $v = v_1 + 1$; | $e_1 \rightarrow e_2(E) \rightarrow e_3 \rightarrow e_4(\bullet) \rightarrow e_5 \rightarrow e_6(\circledast)$ <br><br> $e_1 = \left|\dfrac{j_1, k_1, m_1, Ac}{i_1, c_1, v_1}\right|$, $e_2 = \left|\dfrac{j_2, k_2, 1, Ex}{i_1, c_1, v_1 + 1}\right|$, <br><br> $e_3 = \left|\dfrac{j_2, k_2, 2, (HJo, (j_1, k_3))}{i_1, c_1, v_1 + 2}\right|$, $e_4 = \left|\dfrac{j_1, k_3, 1, (Be, (j_2, k_2, 2))}{i_1, c_1, v_1 - 3}\right|$, <br><br> $e_5 = \left|\dfrac{j_1, k_3, 2, Ac}{i_1, c_1, v_1 + 4}\right|$, $e_6 = \left|\dfrac{j_1, k_4, 3, -}{i_1, c_1, v_1 + 5}\right|$ <br><br> where external ($e_2$) and hJoin({$e_3$}, ($j_1, k_4$)) | unique($j_2$); unique($k_2$); unique($k_3$); record($e_2$); record($e_3$); record($e_4$); record($e_5$); $j \leftarrow j_1$; $k \leftarrow k_3$; $m \leftarrow 3$; $v \leftarrow v_1 + 5$; |
| (P) Suspending a service period to allow object period interleaving. | The process thread is $|j_1, k_1|$ suspended at event $e_2$ and a new object period is begun at $e_3$. | $j = j_1$; $k = k_1$; $m = m_1 + 1$; $c = c_1$; $v = v_1 + 1$; | $e_1(\circledast) \rightarrow e_2 \rightarrow_p e_3(\circledast)$ <br><br> $e_1 = \left|\dfrac{j_1, k_1, m_1, -}{i_1, c_1, v_1}\right|$, $e_2 = \left|\dfrac{j_1, k_1, m_1 + 1, Ac}{i_1, c_1, v_1 - 1}\right|$, $e_3 = \left|\dfrac{j_2, -, -, -}{i_1, c_1 + 1, 1}\right|$ | record($e_2$); $j \leftarrow \emptyset$; $k \leftarrow \emptyset$; $m \leftarrow \emptyset$; $c \leftarrow c_1 + 1$; $v \leftarrow 1$; |
| (Q) Resuming a service period to allow object period interleaving. | The process thread $|j_1, k_1|$ that was suspended at event $e_1$ resumes at event $e_2$. There may be any number of intervening event recorded between $e_1$ and $e_2$. | $j = j_2$; $k = k_2$; $m = m_2$; $c = c_2$; $v = v_2$; | $e_1(\circledast) \rightarrow e_3(\circledast) \rightarrow_p e_2 \rightarrow e_4(\circledast)$ <br><br> $e_1 = \left|\dfrac{j_1, k_1, m_1, Ac}{i_1, c_1, v_1}\right|$, $e_2 = \left|\dfrac{j_1, k_1, m_1 + 1, Ac}{i_1, c_1, v_1 + 1}\right|$, <br><br> $e_3 = \left|\dfrac{j_2, k_2, m_2, -}{i_1, c_2, v_2}\right|$, $e_4 = \left|\dfrac{j_1, k_1, m_1 + 2, -}{i_1, c_1, v_1 + 2}\right|$ | record($e_2$); $j = j_1$; $k = k_1$; $m = m_1 + 2$; $c = c_1$; $v = v_1 + 2$; |

TABLE 6

An Optimized Instrumentation Specification for a Reliable Monitor

| Event Connection Interpretation | Precondition State of Object $i_1$ | Recorded Event Observations | Instrumentation Sequences |
|---|---|---|---|
| (A) External system request. | | See (M), (N), or (O) | |
| (B) End of the object period and process thread. | $j = j_1$; $k = k_1$; $m = m_1 + 1$; $c = c_1$; | No event is recorded | $j \leftarrow \emptyset$; $k \leftarrow \emptyset$; $m \leftarrow \emptyset$; $c \leftarrow c_1 + 1$; |
| (C) An activity event. | $j = j_1$; $k = k_1$; $m = m_1$; $c = c_1$; | (diagram with $e_1, e_2, e_3$)<br>$e_1 = \left\|\dfrac{j_1, k_1, m_1, -}{i_1, c_1}\right\|$, $e_2 = \left\|\dfrac{\emptyset, \emptyset, \emptyset, Ac}{i_1, \emptyset}\right\|$, $e_3 = \left\|\dfrac{j_1, k_1, m_1, -}{i_1, c_1}\right\|$ | record($e_2$); |
| (D) Initiation of an RPC interaction. | $j = j_1$; $k = k_1$; $m = m_1$; $c = c_1$; | (diagram with $e_1, e_2, e_3, e_4$)<br>$e_1 = \left\|\dfrac{j_1, k_1, m_1, -}{i_1, c_1}\right\|$, $e_2 = \left\|\dfrac{\emptyset, \emptyset, \emptyset, Ac}{i_1, \emptyset}\right\|$, $e_3 = \left\|\dfrac{-,-,-,-}{i_1, c_1}\right\|$,<br>$e_4 = \left\|\dfrac{j_1, k_1, m_1 + 1, -}{i_2, -}\right\|$ | send($e_2$, $S_1$, $S_2$) where<br>$S_1 \leftarrow (j_1, k_1, m_1)$,<br>$S_2 \leftarrow (j_1, k_1, m_1 + 1)$;<br>record($e_2$);<br>$j \leftarrow \emptyset$;<br>$k \leftarrow \emptyset$;<br>$m \leftarrow \emptyset$ |
| (E) Acceptance of a service request sent as an RPC interaction. | rev($e_3$, $S_1$, $S_2$) where<br>$S_1 = (j_1, k_1, m_1)$,<br>$S_2 = (j_1, k_1, m_1 + 1)$;<br>$j = \emptyset$; $k = \emptyset$;<br>$m = \emptyset$; $c = c_1 + 1$ | (diagram with $e_1, e_2, e_3, e_4$)<br>$e_1 = \left\|\dfrac{j_1, k_1, m_1, -}{i_2, -}\right\|$, $e_2 = \left\|\dfrac{-,-,-,-}{i_1, c_1,}\right\|$,<br>$e_3 = \left\|\dfrac{j_1, k_1, m_1 + 1, Ac}{i_1, c_1 + 1}\right\|$, $e_4 = \left\|\dfrac{j_1, k_1, m_1 + 1, -}{i_1, c_1 + 1}\right\|$ | record($e_3$);<br>$j \leftarrow j_1$;<br>$k \leftarrow k_1$;<br>$m \leftarrow m_1 + 1$ |
| (F) Sending the reply to a service request sent as an RPC interaction. The responding object's service period ends. | $j = j_1$; $k = k_1$; $m = m_1$; $c = c_1$; | (diagram with $e_1, e_2, e_3, e_4$)<br>$e_1 = \left\|\dfrac{j_1, k_1, m_1, -}{i_1, c_1}\right\|$, $e_2 = \left\|\dfrac{\emptyset, \emptyset, \emptyset, Ac}{i_1, \emptyset}\right\|$,<br>$e_3 = \left\|\dfrac{j_1, k_1, m_1 + 1, -}{i_2, -}\right\|$, $e_4 = \left\|\dfrac{-,-,-,-}{i_1, c_1 + 1}\right\|$ | send($e_2$, $S_1$, $S_2$) where<br>$S_1 \leftarrow (j_1, k_1, m_1)$,<br>$S_2 \leftarrow (j_1, k_1, m_1 + 1)$;<br>record($e_2$);<br>$j \leftarrow \emptyset$; $k \leftarrow \emptyset$;<br>$m \leftarrow \emptyset$; $c \leftarrow c_1 + 1$; |

TABLE 6-continued

An Optimized Instrumentation Specification for a Reliable Monitor

| Event Connection Interpretation | Precondition State of Object $i_1$ | Recorded Event Observations | Instrumentation Sequences |
|---|---|---|---|
| (G) A blocked initiating object in an RPC interaction receives the reply to its service request. The replying object ended its service period after it sent the reply. | $rev(e_3, S_1, S_2)$ where $S_1 = (j_1, k_2, m_2)$, $S_2 = (j_1, k_2, m_2 + 1)$; $j = \emptyset; k = \emptyset;$ $m = \emptyset; c = c_1;$ | 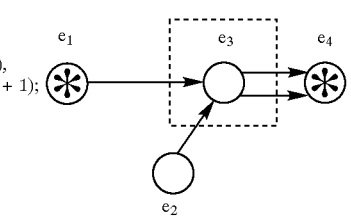<br><br>$e_1 = \left\| \begin{array}{c} -,-,-,- \\ \hline i_1, c_1 \end{array} \right\|, \quad e_2 = \left\| \begin{array}{c} j_1, k_2, m_2, - \\ \hline i_2, - \end{array} \right\|,$<br><br>$e_3 = \left\| \begin{array}{c} j_1, k_2, m_2 + 1, Ac \\ \hline i_1, \emptyset \end{array} \right\|, \quad e_4 = \left\| \begin{array}{c} j_1, k_1, m_2 + 1, - \\ \hline i_1, c_1 \end{array} \right\|$ | $record(e_3);$<br>$j \leftarrow j_1;$<br>$k \leftarrow k_2;$<br>$m \leftarrow m_2 + 2;$<br>$v \leftarrow v_1 + 2;$ |
| (H) There are three interpretations: (1) An initiating object initiates an asynchronous interaction. (2) A responding object sends the reply to a service request sent as an RPC interaction and the responding object does not end it service period but continues executing after sending the reply. (3) A forwarding object forwards the service request to another responding object. | $j = j_1;$ $k = k_1;$ $m = m_1 + 1;$ $c = c_1;$ | 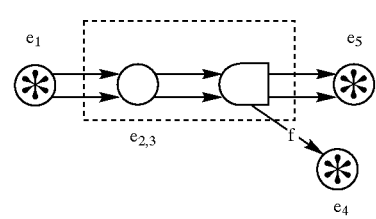<br><br>$e_1 = \left\| \begin{array}{c} j_1, k_1, m_1, - \\ \hline i_1, c_1 \end{array} \right\|, \quad e_{2,3} = \left\| \begin{array}{c} -,-,-, (Ac, Fo) \\ \hline i_1, \emptyset \end{array} \right\|,$<br><br>$e_4 = \left\| \begin{array}{c} j_1, k_2, 1, - \\ \hline i_2, - \end{array} \right\|, \quad e_5 = \left\| \begin{array}{c} j_1, k_1, m_1 + 1, - \\ \hline i_1, c_1 \end{array} \right\|$ | $unique(k_2);$<br>$send(e_{2,3}, S_1, S_2)$ where<br>$S_1 \leftarrow (j_1, k_1, m_1),$<br>$S_2 \leftarrow (j_1, k_2, 1);$<br>$record(e_{2,3});$<br>$m \leftarrow m_1 + 1;$ |
| (I) A blocked object that is not processing a previously accepted service request now accepts a service request that was sent asynchronously | $rev(e_{2,3}, S_1, S_2)$ where $S_1 = (j_1, k_1, m_1),$ $S_2 = (j_1, k_2, 1);$ $j = \emptyset;$ $k = \emptyset;$ $m = \emptyset;$ $c = c_1$ | 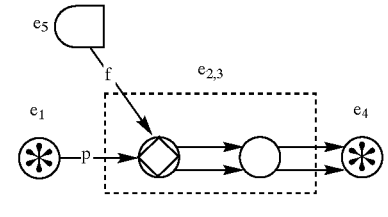<br><br>$e_1 = \left\| \begin{array}{c} -,-,-,- \\ \hline i_1, c_1 - 1 \end{array} \right\|, \quad e_{2,3} = \left\| \begin{array}{c} j_1, k_2, \emptyset, (Be, (k_1, m_1) Ac \\ \hline i_1, c_1 \end{array} \right\|,$<br><br>$e_4 = \left\| \begin{array}{c} j_1, k_2, 1, - \\ \hline i_1, c_1 \end{array} \right\|, \quad e_5 = \left\| \begin{array}{c} j_1, k_1, m_1 \\ \hline i_2, - \end{array} \right\|$ | $record(e_{2,3});$<br>$j \leftarrow j_1;$<br>$k \leftarrow k_2;$<br>$m \leftarrow 1;$ |
| (J) A blocked object that is processing a previously accepted service request completes a synchronization by accepting a service request. The service request was sent as an RPC interaction. | $rev(e_{2,3,4,5}, S_1, S_2)$ where $S_1 = (j_2, k_2, m_2),$ $S_2 = (j_2, k_2, m_2 + 1);$ $j = j_1;$ $k = k_1;$ $m = m_1;$ $c = c_1;$ | 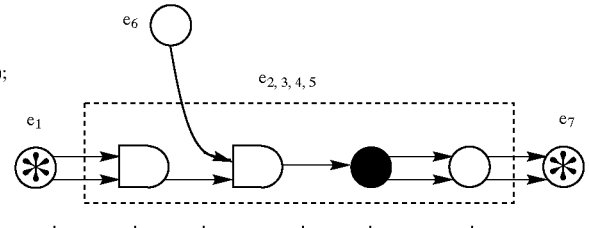<br><br>$e_1 = \left\| \begin{array}{c} -,-,-,- \\ \hline i_1, c_1 \end{array} \right\|, \quad e_6 = \left\| \begin{array}{c} j_2, k_2, m_2 \\ \hline i_2, - \end{array} \right\|, \quad e_7 = \left\| \begin{array}{c} j_1, k_3, 1, - \\ \hline i_1, c_1 \end{array} \right\|,$<br><br>$e_{2,3,4,5} = \left\| \begin{array}{c} j_1, k_3, \emptyset, (HJo, HJo, (Be, (j_2, k_2, m_2 + 1), (j_1, k_1, m_1)), Ac) \\ \hline i_1, \emptyset \end{array} \right\|,$ | $unique(k_3);$<br>$record(e_{2,3,4,5});$<br>$k \leftarrow k_3;$<br>$m \leftarrow 1;$ |

TABLE 6-continued

An Optimized Instrumentation Specification for a Reliable Monitor

| Event Connection Interpretation | Precondition State of Object $i_1$ | Recorded Event Observations | Instrumentation Sequences |
|---|---|---|---|
| (K) A blocked initiating object in an RPC interaction becomes unblocked by receiving the reply to its service request and the replying object did not end its service period after it sent the reply. The blocked initiating object may also become unblocked due to an RPC interruption | $rev(e_{2,3,4,5}, S_1, S_2)$ where $S_1 = (j_2, k_2, m_2)$, $S_2 = (j_2, k_3, 1)$; $j = \emptyset$; $k = \emptyset$; $m = \emptyset$; $c = c_1$; | 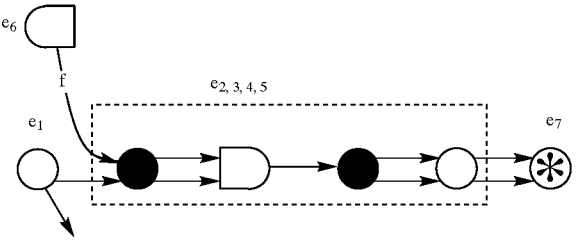<br><br>$e_1 = \left\| \dfrac{-,-,-,-}{i_1, c_1} \right\|$, $e_6 = \left\| \dfrac{j_2, k_2, m_2, Fo}{i_2, -} \right\|$, $e_7 = \left\| \dfrac{j_1, k_4, 1, -}{i_1, c_1} \right\|$<br><br>$e_{2,3,4,5} = \left\| \dfrac{j_1, k_4, \emptyset, (Be, (j_2, k_2, m_2), HJo, (Be, (j_2, k_3, 2)), Ac}{i_1, \emptyset} \right\|$, | $unique(k_4)$; $record(e_{2,3,4,5})$ $j \leftarrow j_1$; $k \leftarrow k_4$; $m \leftarrow 1$; |
| (L) A blocked object that is processing a previously accepted service request completes a synchronization by accepting a service request. The service request was sent as an asynchronous interaction | $rev(e_2, S_1, S_2)$ where $S_1 = (j_2, k_2, m_2)$, $S_2 = (j_2, k_3, 1)$; $j = j_1$; $k = k_1$; $m = m_1$; $c = c_1$; | 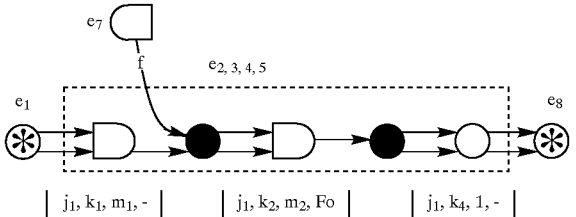<br><br>$e_1 = \left\| \dfrac{j_1, k_1, m_1, -}{i_1, c_1} \right\|$, $e_7 = \left\| \dfrac{j_1, k_2, m_2, Fo}{i_2, -} \right\|$, $e_8 = \left\| \dfrac{j_1, k_4, 1, -}{i_1, c_1} \right\|$<br><br>$e_{2,3,4,5} = \left\| \dfrac{j_1, k_4, \emptyset, (HJo, (Be, (j_2, k_2, m_2)), HJo, (Be, (j_2, k_3, 2)), Ac}{i_1, \emptyset} \right\|$, | $unique(k_4)$; $record(e_{2,3,4,5})$ $k \leftarrow k_4$; $m \leftarrow 1$; |
| (M) A blocked object that is not processing a previously accepted service request now begins an process thread because of an external request. | $j = \emptyset$; $k = \emptyset$; $m = \emptyset$; $c = c_1$ | 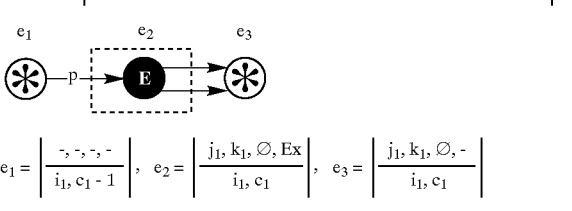<br><br>$e_1 = \left\| \dfrac{-,-,-,-}{i_1, c_1 - 1} \right\|$, $e_2 = \left\| \dfrac{j_1, k_1, \emptyset, Ex}{i_1, c_1} \right\|$, $e_3 = \left\| \dfrac{j_1, k_1, \emptyset, -}{i_1, c_1} \right\|$ | $unique(j_1)$; $unique(k_1)$; $record(e_2)$; $j \leftarrow j_1$; $k \leftarrow k_1$; $m \leftarrow 1$; |
| (N) A blocked object that is processing a previously accepted service request completes a synchronization by accepting an external request (e.g., a received message without time stamp information is an external event). | $j = j_1$; $k = k_1$; $m = m_1$; $c = c_1$; | 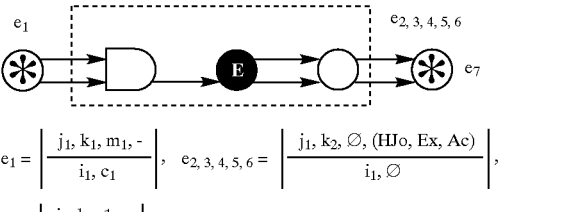<br><br>$e_1 = \left\| \dfrac{j_1, k_1, m_1, -}{i_1, c_1} \right\|$, $e_{2,3,4,5,6} = \left\| \dfrac{j_1, k_2, \emptyset, (HJo, Ex, Ac)}{i_1, \emptyset} \right\|$,<br><br>$e_7 = \left\| \dfrac{j_1, k_2, 1, -}{i_1, c_1} \right\|$ | $unique(j_2)$; $unique(k_4)$; $record(e_{2,3,4,5,6})$ $k \leftarrow k_2$; $m \leftarrow 1$; |
| (O) A blocked initiating object in an RPC interaction becomes unblocked due to an RPC interruption caused by an external event. | $j = j_1$; $k = k_1$; $m = m_1$; $c = c_1$; | 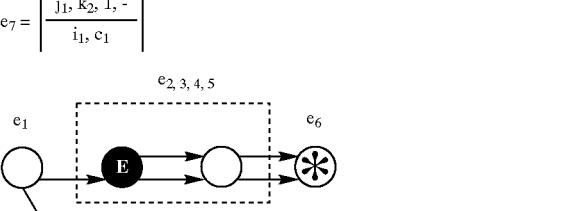<br><br>$e_1 = \left\| \dfrac{j_1, k_1, m_1, -}{i_1, c_1} \right\|$, $e_{2,3,4,5} = \left\| \dfrac{j_1, k_2, \emptyset, (Ex, Ac)}{i_1, \emptyset} \right\|$,<br><br>$e_6 = \left\| \dfrac{j_1, k_2, 1, -}{i_1, c_1} \right\|$ | $unique(j_2)$; $unique(k_2)$; $record(e_{2,3,4,5})$; $k \leftarrow k_2$; $m \leftarrow 1$; |

TABLE 6-continued

An Optimized Instrumentation Specification for a Reliable Monitor

| Event Connection Interpretation | Precondition State of Object $i_1$ | Recorded Event Observations | Instrumentation Sequences |
|---|---|---|---|
| (P) Suspending a service period to allow object period interleaving. | $j = j_1$; $k = k_1$; $m = m_1 + 1$; $c = c_1$; | $e_1 = \left\|\dfrac{j_1, k_1, m_1, -}{i_1, c_1}\right\|$, $e_2 = \left\|\dfrac{j_1, k_1, m_1 + 1, Ac}{i_1, c_1}\right\|$, $e_3 = \left\|\dfrac{j_2, -, -, -}{i_1, c_1 + 1}\right\|$ | record($e_2$); $j \leftarrow \varnothing$; $k \leftarrow \varnothing$; $m \leftarrow \varnothing$; $c \leftarrow c_1 + 1$; |
| (Q) Resuming a service period to allow object period interleaving. | $j = j_2$; $k = k_2$; $m = m_2$; $c = c_2$ | $e_1 = \left\|\dfrac{j_1, k_1, m_1, Ac}{i_1, c_1}\right\|$, $e_2 = \left\|\dfrac{j_1, k_1, m_1 + 1, Ac}{i_1, c_1}\right\|$, $e_3 = \left\|\dfrac{j_2, k_2, m_2, -}{i_1, c_2}\right\|$, $e_4 = \left\|\dfrac{j_1, k_1, m_1 + 2, -}{i_1, c_1}\right\|$ | $j = j_1$; $k = k_1$; $m = m_1 + 2$; $c = c_1$, record($e_2$); |

What is claimed is:

1. A method of determining, from recorded information relating to events occurring during execution of a process, a plurality of the events that are causally connected by scenario causality and precedence causality, the method comprising the steps of:
   (a) translating the recorded information relating to the events to statements in a first scenario graph language;
   (b) determining from the first graph language statements, information relating to execution flow of the process wherein each first graph language statement comprises information relating to a predetermined execution flow of the process; and,
   (c) based on the information relating to an execution flow of the process, determining, for a first plurality of events, events that precede each event from the first plurality of the events that are causally connected by scenario causality to said event from the first plurality of the events.

2. A method of determining a plurality of the events that are causally connected as defined in claim 1, comprising the step of:
   performing run time behavior verification by analysis of the scenario event graph, or combinations thereof, for one of race conditions, live lock conditions, and deadlock conditions.

3. A method of determining a plurality of the events that are causally connected as defined in claim 1, comprising the step of:
   determining the identity type of a scenario during execution and providing a different level or style of service based on this determination.

4. A method of determining a plurality of the events that are causally connected as defined in claim 1, comprising the steps of:
   monitoring a process during execution; and,
   recording the information relating to events occurring during execution of the process, the recorded information comprising at least a time value from each of at least two clocks and wherein at least one of the clocks is a logical clock.

5. A method of determining a plurality of the events that are causally connected as defined in claim 1, wherein translating the recorded information is performed in each of two domains; and, wherein determining from the statements information relating to execution flow of the process is performed in dependence upon the statements in each domain.

6. A method of determining a plurality of the events that are causally connected as defined in claim 1, wherein the process is a process executed by a microprocessor.

7. A method of determining a plurality of the events that are causally connected as defined in claim 1, wherein the process is a process executed in software on at least two processors in a distributed system and wherein the information relating to events comprises information relating to a time measured by a logical clock and another time measured by another clock.

8. A method of determining a plurality of the events that are causally connected as defined in claim 1, wherein a statement in the first graph language represents a node having an out degree of at least 2 and wherein statement in the first graph language represents a node having in degree of at least 2.

9. A method of determining a plurality of the events that are causally connected as defined in claim 1, wherein the recorded information relating to events comprises process event information and object event information.

10. A method of determining a plurality of the events that are causally connected as defined in claim 1, wherein the statements form a graph language that is complete and sound.

11. A method of determining a plurality of the events that are causally connected as defined in claim 1, wherein the statements relate to delimiting and progress events of a process and of an object.

12. A method of determining a plurality of the events that are causally connected as defined in claim 1, wherein the first graph language has nodes and edges from a group of: external, thread begin, and-join, and-fork, thread end, activity, object period start, start process, next object event, next process node, next object period, and process thread fork.

13. A method of determining a plurality of the events that are causally connected as defined in claim 1, comprising the step of determining a UML behavioural diagram relating to process execution.

14. A method of determining a plurality of the events that are causally connected as defined in claim 1, comprising the step of determining a message sequence chart relating to process execution.

15. A method of determining a plurality of the events that are causally connected as defined in claim 1, comprising the step of determining design related information for use in one of design verification, business process modelling, performance modelling, and optimisation.

16. A method of determining a plurality of the events that are causally connected as defined in claim 1, wherein the recorded events form an angio trace defined as $G_{Trace}=(N, \Sigma_n, M_n, P, \Omega)$ where N is a set of recorded events; $\Sigma_n$ is the alphabet of event time stamps; $M_n:N \rightarrow \Sigma_n$ is the mapping of events to time stamps; P is a set of event predicates for identifying the type of an event; and, $\Omega$ is a set of partial-ordering relations.

17. A method of determining a plurality of the events that are causally connected as defined in claim 1, wherein the recorded information relating to an event comprises an event type from external event; process thread begin event; process activity event; process thread fork event; process thread half-join event; and process thread end event.

18. A method of determining a plurality of the events that are causally connected as defined in claim 1, comprising the step of:
the replaying of execution of a scenario and system behavior on one of the actual system, a simulator tool, and a visualisation tool.

19. A method of determining a plurality of the events that are causally connected as defined in claim 1, wherein the process is a process executed in computer software and comprising the step of:
performing pattern analysis on the statements to detect at least one of software design and software execution patterns therein.

20. A method of determining a plurality of events that are causally connected for use with recorded information relating to the events occurring during execution of a process, the method comprising the steps of:
analysing the recorded information to determine a partial order of events from each of two relative perspectives;
combining the two partial orders of events to produce information relating to some forms of scenario causality and precedence causality.

21. A method of determining a plurality of events that are causally connected as defined in claim 20, wherein the recorded information relating to the events comprises at least an event type and two time stamps from each of two clocks wherein a clock from the two clocks is a logical clock and wherein causality is deduced in dependence upon precedence determined from the partial orders and recorded event types.

* * * * *